(12) United States Patent
Suzuki

(10) Patent No.: US 10,965,234 B2
(45) Date of Patent: Mar. 30, 2021

(54) MOTOR CONTROLLER AND ELECTRIC POWER STEERING DEVICE HAVING SAME

(71) Applicant: DENSO CORPORATION, Kariya (JP)

(72) Inventor: Haruo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/751,550

(22) Filed: Jan. 24, 2020

(65) Prior Publication Data

US 2020/0252015 A1 Aug. 6, 2020

(30) Foreign Application Priority Data

Feb. 6, 2019 (JP) .............................. JP2019-020049

(51) Int. Cl.
| | |
|---|---|
| H02P 21/00 | (2016.01) |
| H02P 21/22 | (2016.01) |
| H02P 21/05 | (2006.01) |
| B62D 5/04 | (2006.01) |
| H02P 27/12 | (2006.01) |

(52) U.S. Cl.
CPC ............. *H02P 21/22* (2016.02); *B62D 5/0463* (2013.01); *H02P 21/05* (2013.01); *H02P 27/12* (2013.01); *B62D 5/0412* (2013.01)

(58) Field of Classification Search
CPC ........... H02P 21/22; H02P 21/05; H02P 27/12
USPC .................................................. 318/400.02
See application file for complete search history.

(56) References Cited

U.S. PATENT DOCUMENTS

| | | | |
|---|---|---|---|
| 2009/0079375 A1 | 3/2009 | Suzuki | |
| 2009/0128081 A1* | 5/2009 | Yoneda | B62D 5/046 318/689 |
| 2012/0176068 A1* | 7/2012 | Tsuji | H02P 21/20 318/400.02 |
| 2013/0285591 A1 | 10/2013 | Suzuki | |
| 2015/0333681 A1* | 11/2015 | Matsuki | H02P 21/0085 318/400.02 |
| 2016/0028340 A1* | 1/2016 | Nakai | H02P 21/05 318/400.02 |

(Continued)

FOREIGN PATENT DOCUMENTS

| | | |
|---|---|---|
| JP | 5109554 B2 | 12/2012 |
| JP | 5556845 B2 | 7/2014 |

(Continued)

*Primary Examiner* — Erick D Glass
(74) *Attorney, Agent, or Firm* — Maschoff Brennan

(57) ABSTRACT

A motor controller for driving an interior permanent magnet (IPM) motor has a current feedback control unit that calculates a q-axis current restriction value based on a dq-axis voltage instruction value and a dq-axis current detection value, so that a power source current flowing in an inverter circuit is controlled to be equal to or lower than a target power source current. Provided that a torque current proportional to an output torque of the motor is defined as a torque current, a torque current converter converts the q-axis current restriction value to a torque current restriction value by using a d-axis current detection value. A torque current instruction value restrictor restricts a torque current instruction value with the torque current restriction value. A dq-axis current converter converts a post-restriction torque current instruction value to a d-axis current instruction value and a q-axis current restriction value.

9 Claims, 19 Drawing Sheets

(56) References Cited

U.S. PATENT DOCUMENTS

2017/0331403 A1* 11/2017 Irie .................... H02P 21/0003
2018/0091081 A1   3/2018 Suzuki et al.

FOREIGN PATENT DOCUMENTS

JP   2018-057166 A   4/2018
WO   2019/039480 A1   2/2019

* cited by examiner

MOTOR CONTROLLER AND ELECTRIC POWER STEERING DEVICE HAVING SAME

CROSS REFERENCE TO RELATED APPLICATION

The present application is based on and claims the benefit of priority of Japanese Patent Application No. 2019-020049, filed on Feb. 6, 2019, the disclosure of which is incorporated herein by reference.

TECHNICAL FIELD

The present disclosure generally relates to a motor controller and an electric power steering device having the same.

BACKGROUND INFORMATION

In the related art, in a motor controller that converts a direct current (DC) power from a power source into an alternating current (AC) power by using an inverter circuit and supplies the converted current to a motor, a technique is known that limits a power source current, which is an electric current flowing from the power source to the inverter circuit, to an allowable upper limit or less.

For example, the related art motor controller uses a current restriction value calculated based on a voltage instruction value, a current detection value, and a target power source current (i.e., in the related art, it is designated as an "inverter current restriction value") to correct a current instruction value. By calculating the current restriction value using the voltage instruction value, the power source current can be stably restricted to the target power source current or less even when a wiring resistance, a torque constant, an inverse electromotive force constant, or the like may change.

Although the motor is described as a three-phase AC brushless motor in the related art, the difference of the characteristics between the interior permanent magnet (IPM) motor and the surface permanent magnet (SPM) motor is not considered. That is, in the salient IPM motor, the output torque is under an influence of the reluctance torque generated due to a difference between a d-axis inductance and a q-axis inductance, which is not considered in the related art motor controller. Therefore, when the motor controller of the related art is applied to an IPM motor, a sufficient effect may be not exhibited.

SUMMARY

It is an object of the present disclosure to provide a motor controller for appropriately restricting a power source current when the controller is applied to an IPM motor, and an electric power steering device including the same.

The motor controller according to the present disclosure uses the torque current proportional to the output torque of the motor, and restricts the torque current instruction value by the torque current restriction value converted from the dq-axis current restriction value. Therefore, the power source current can be appropriately restricted even when the motor controller is applied to an IPM motor that generates a reluctance torque that depends on both of the d-axis current and the q-axis current.

Further, the present disclosure is also provided as an electric power steering device including (i) a motor that outputs a steering assist torque and (ii) the above-described motor controller that controls the drive of such motor. In the electric power steering device that is required to achieve both of a volume/size reduction and durability to high current at the time of abrupt steering, the above-described effects of the motor controller are particularly advantageously exertable.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
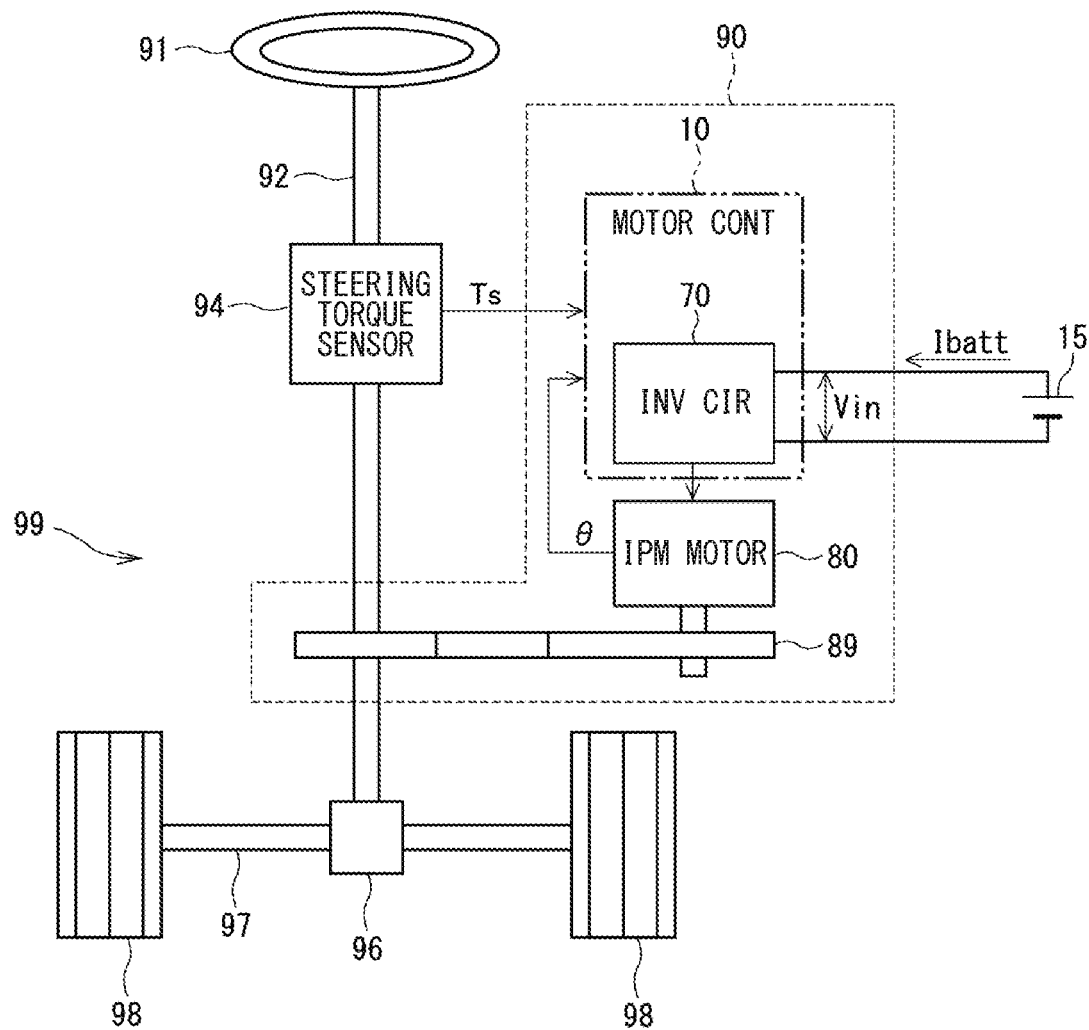
FIG. 1 is a schematic block diagram of an electric power steering device to which a motor controller of each embodiment is applied.

A motor controller is described with reference to plural embodiments shown in the accompanying drawings. The motor controller of each embodiment is applied to an electric power steering device of a vehicle and controls the drive of a steering assist motor. Substantially same configurations in the plurality of embodiments are assigned with same reference numerals and descriptions thereof are basically not repeated in the description. The following first to sixth embodiments are collectively referred to as a present embodiment.

[Electric Power Steering Device]

FIG. 1 shows an overall configuration of a steering system 99 including an electric power steering device 90. Although the electric power steering device 90 of FIG. 1 is a column assist type, the motor controller 10 of the present embodiment is similarly applicable to a rack assist type electric power steering device. A steering system 99 includes a steering wheel 91, a steering shaft 92, a pinion gear 96, a rack shaft 97, road wheels 98, the electric power steering device 90 and the like. The steering shaft 92 is coupled with the steering wheel 91.

The pinion gear 96 provided at an end of the steering shaft 92 engages with the rack shaft 97. A pair of road wheels 98 are provided at both ends of the rack shaft 97 via, for example, tie rods. When a driver rotates the steering wheel 91, the steering shaft 92 coupled with the steering wheel 91 rotates. A rotational motion of the steering shaft 92 is converted into a linear motion of the rack shaft 97 by the pinion gear 96 and the pair of road wheels 98 are steered at to an angle corresponding to a displacement amount of the rack shaft 97.

The electric power steering device 90 includes a steering torque sensor 94, a motor controller 10, a motor 80, a speed reduction gear 89, and the like. The steering torque sensor 94 is provided in the middle of the steering shaft 92, and detects a steering torque Ts of the driver. The motor controller 10 acquires information such as the steering torque Ts, a steering speed, a vehicle speed and the like from the other device(s), and controls the drive of the motor 80 so that the motor 80 outputs a desired assist torque calculated from these pieces of information. The assist torque generated by the motor 80 is transmitted to the steering shaft 92 via the speed reduction gear 89.

The motor 80 is a three-phase AC brushless motor. In the present embodiment, in particular, the motor 80 is an IPM motor, that is, an interior permanent magnet type synchronous rotating machine having saliency. In general, a torque Trq of the motor is represented by an equation (1) based on a number of pole pairs p, a inverse electromotive force constant φ, dq-axis inductances Ld and Lq, and dq-axis currents Id and Iq. The first term on the right side of the equation (1) indicates the magnet torque, and the second term indicates the reluctance torque.

[Equation 1]

$$Trq = p \times \varphi \times Iq + p \times (Ld - Lq) \times Id \times Iq \quad (1)$$

In the surface permanent magnet type (SPM) motor, no reluctance torque is generated due to its characteristics of "Ld=Lq," whereas, in the IPM motor having characteristics of "Ld≠Lq," a reluctance torque is generated in addition to the magnet torque. Therefore, the sum of the magnet torque and the reluctance torque is the output torque of the motor 80.

The motor controller 10 includes an inverter circuit 70. The inverter circuit 70 is constituted as a plurality of switching elements of upper and lower arms connected in a bridge form, which is not shown in the drawing because it is a known technology, with a smoothing capacitor provided at an input part thereof. The inverter circuit 70 converts a DC power from the battery 15 serving as a "power source" to an AC power, and supplies the AC power to the motor 80.

Each of calculation units of the motor controller 10 that calculates instructions to the inverter circuit 70 is configured as a microcomputer, a pre-driver, and the like, and includes non-illustrated CPU, ROM, I/O, and bus lines connecting those components, and the like. The motor controller 10 performs control, as software processing by executing a program stored in advance by the CPU or hardware processing by using a dedicated electronic circuit.

Specifically, the motor controller 10 controls the drive of the IPM motor 80 by feedback control of the dq-axis current detection value with respect to the dq-axis current instruction value in a vector control. Hereinafter, a direct current flowing from the battery 15 to the inverter circuit 70 is referred to as a "power source current Ibatt," and a direct current voltage applied to the input part of the inverter circuit 70 is referred to as "inverter input voltage Vin." Further, from the viewpoint of protecting the inverter circuit 70 from an overcurrent, an upper limit value of the power source current Ibatt is set as a "target power source current Ibatt_lim."

The related art discloses a motor controller (i) calculating a current restriction value based on a voltage instruction value, a current detection value, and a target power source current so that the power source current is equal to or less than the target power source current, and (ii) correcting a current instruction value by using the current restriction value. However, the related art does not take into consideration that the output torque of the IPM motor is affected by the reluctance torque, thereby when such a controller is applied to an IPM motor, there may be a possibility that the effects of such controller may be not exhibited.

Therefore, the motor controller 10 according to the present embodiment aims to appropriately limit the power source current Ibatt when the controller 10 is applied to an IPM motor. The specific configuration for such purposes is described in detail for each of the respective embodiments. Here, a group or a unit of components for calculating an instruction or instructions to the inverter circuit by current feedback control is defined as "system." In the following first to fifth embodiments, a single-system motor controller 101 (i.e., having one system of components) is described, and in the sixth embodiment, a two-system motor controller 106 (i.e., having two systems of components) is described as a representative example of a plurality of systems.

First Embodiment

Figure 2:
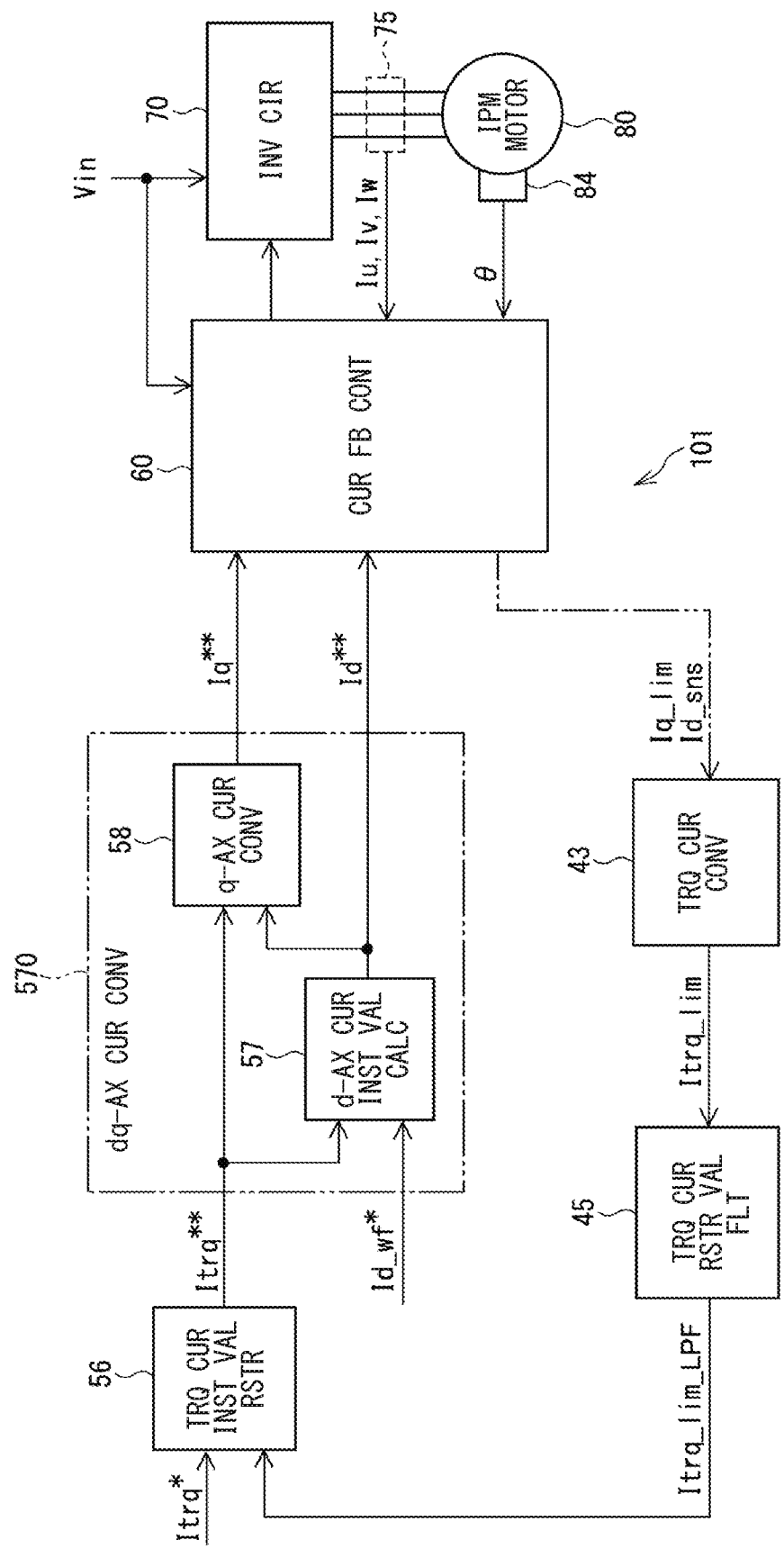
FIG. 2 is a control block diagram of a motor controller having one system in first to fifth embodiments.

The configuration of the motor controller 101 having one system is described with reference to FIGS. 2 to 4. As shown in FIG. 2, the motor controller 101 includes a current feedback controller 60, an inverter circuit 70, a torque current converter 43, a torque current restriction value filter 45, a torque current instruction value restrictor 56, and a dq-axis current converter 570. The dq-axis current converter 570 further includes a d-axis current instruction value calculator 47 and a q-axis current converter 58.

Further, a current sensor 75 for detecting a phase current flowing from the inverter circuit 70 to the motor 80 and a rotation angle sensor 84 for detecting an electric angle θ of the motor 80 are provided. Three-phase currents Iu, Iv, Iw may be detected by the current sensor 75, or, alternatively, two of the three phases may be detected with a remaining one-phase current calculated therefrom by using Kirchhoff's law. Further, the arrangement of the current sensor 75 is not restricted to a position on a power path between the inverter circuit 70 and the motor 80 as shown in FIG. 2, but may be arranged inside the inverter circuit 70.

In the present embodiment, an electric current proportional to the output torque of the motor 80 is defined as a "torque current Itrq." In an equation (2) obtained by modifying the equation (1) about the motor torque, for example, an underlined part by a broken line can be regarded as the torque current Itrq. However, a proportionality constant may be adjusted as appropriate.

[Equation 2]

$$Trq = p \times \phi \times \left\{ 1 + \frac{(Ld - Lq) \times Id}{\phi} \right\} \times Iq = p \times \phi \times Itrq \quad (2)$$

In an SPM motor with the characteristics of "Ld=Lq," since the term of the d-axis current Id is equal to 0, the torque current Itrq is determined only by the q-axis current Iq. On the other hand, in an IPM motor in which "Ld≠Lq," the torque current Itrq is a function of two variables of the d-axis current Id and the q-axis current Iq. An upper-hierarchy calculation circuit converts a torque instruction value required for the motor 80 to a torque current instruction value Itrq*, and sends an instruction to the torque current instruction value restrictor 56.

If the torque current instruction value Itrq* is not restricted, the torque current instruction value Itrq* is treated as it is (i.e., without conversion) as the d-axis current instruction value Id* and the q-axis current instruction value Iq* by the dq-axis current converter 570, and is input to the current feedback controller 60. In the present embodiment, a configuration is added to the above-described basic flow, in which the torque current instruction value Itrq* is restricted to the torque current restriction value Itrq_lim so that the power source current Ibatt becomes equal to or less than the target power source current Ibatt_lim. In the specification of the present disclosure, a symbol of pre-restriction instruction value has a single asterisk "*" attached therewith, and a symbol of post-restriction instruction value has a double asterisk "**" attached therewith.

Before describing the configuration related to the torque current restriction value Itrq_lim, the configuration of the current feedback controller 60 is described. The current feedback controller 60 acquires detection values of the phase currents Iu, Iv, Iw detected by the current sensor 75, and also acquires the electric angle θ of the motor 80 detected by the rotation angle sensor 84. Further, the current feedback controller 60 acquires the inverter input voltage Vin from a voltage sensor or the like (not shown). The current feedback controller 60 drives the inverter circuit 70 by feedback control based on the acquired information. Further, the current feedback controller 60 acquires ambient temperature of the inverter circuit 70 from a temperature sensor just like the motor controller of the related art.

Figure 3:
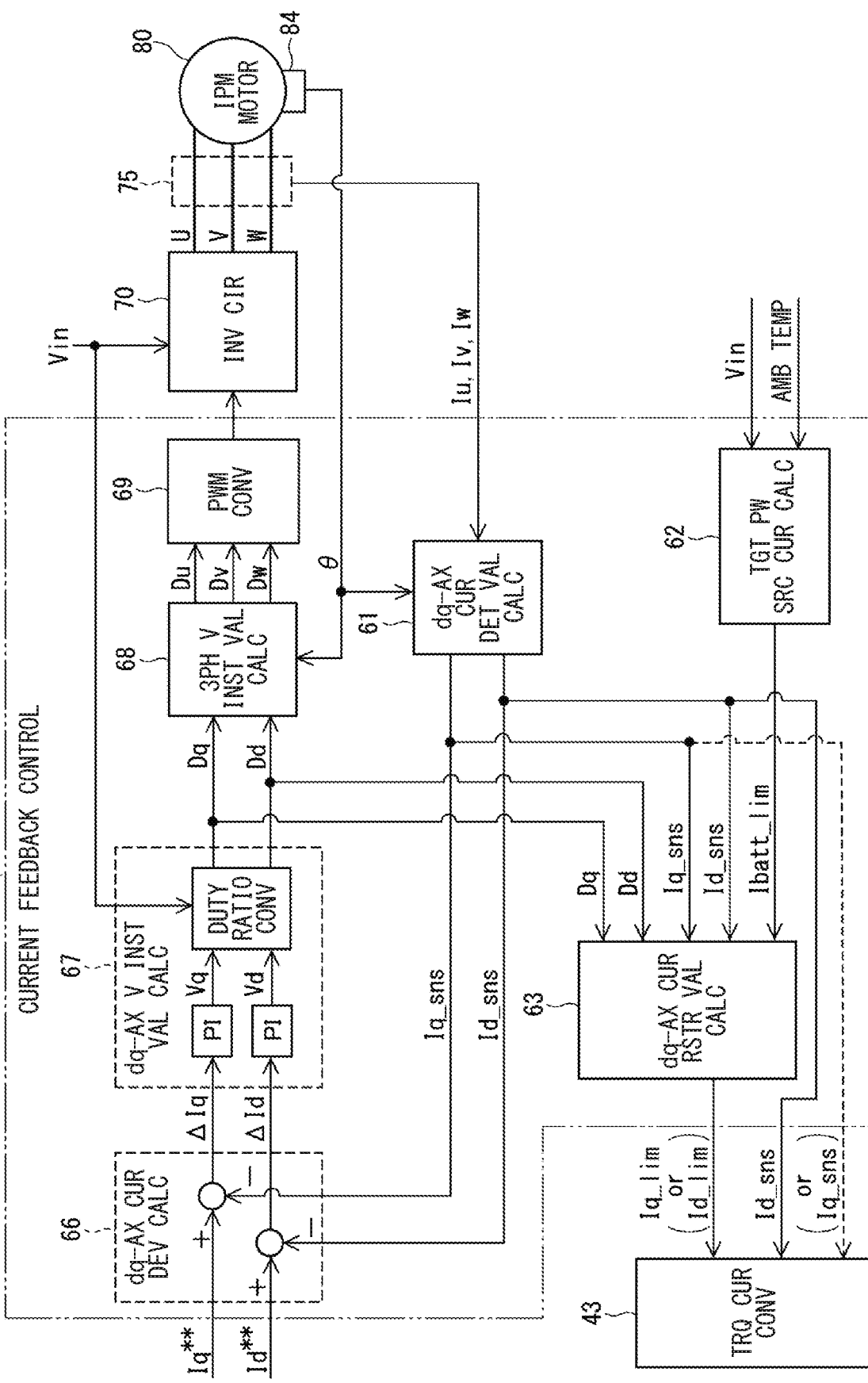
FIG. 3 is a detailed block diagram of a current feedback controller of FIG. 2.
Figure 4:
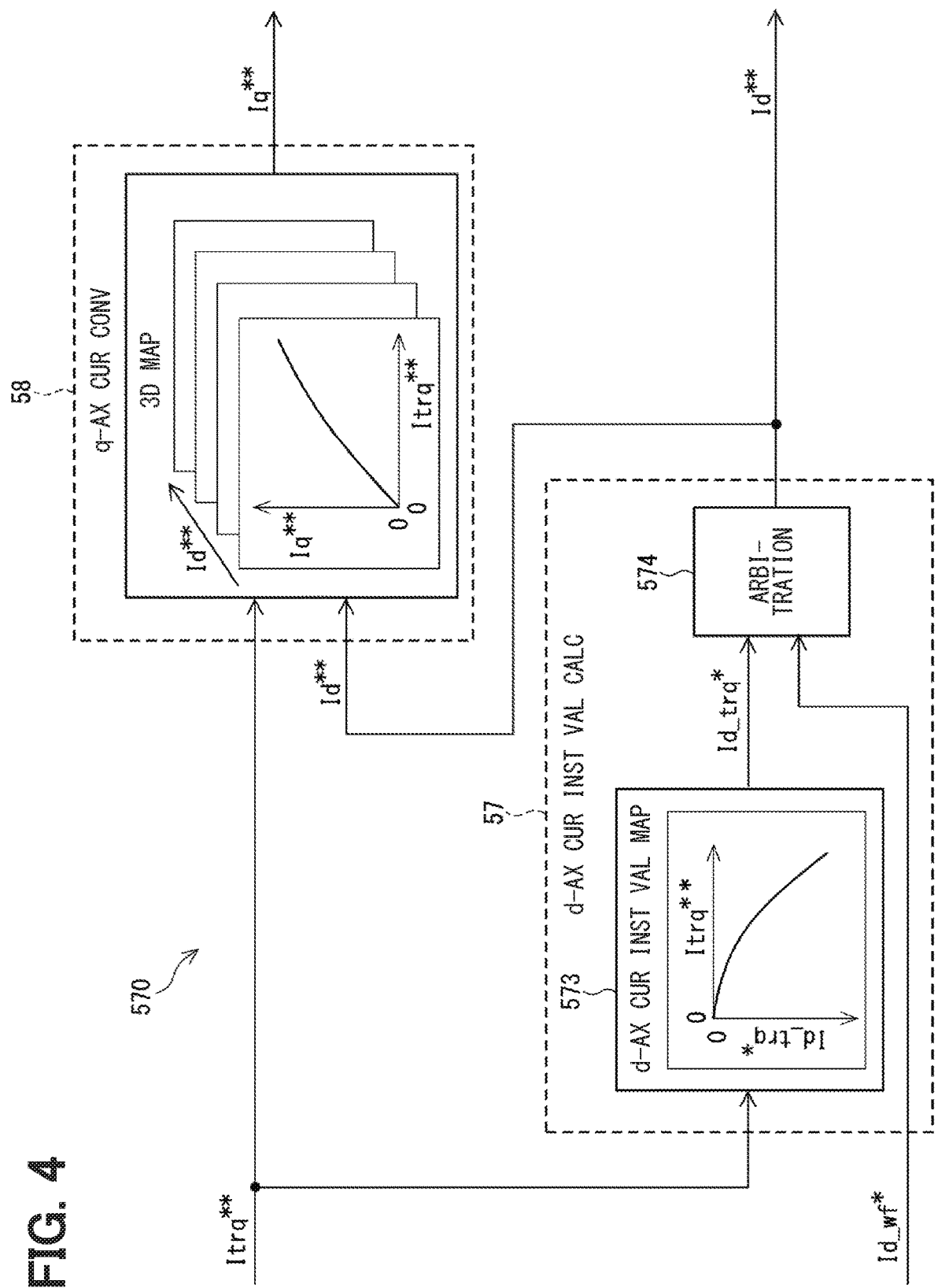
FIG. 4 is a detailed block diagram of a d-axis current instruction value calculator and a dq-axis current converter of FIG. 2.

The detailed configuration of the current feedback controller 60 is shown in FIG. 3. In the specification of the present disclosure, in addition to the components of a general current feedback controller, portions corresponding to an "inverter restricted current calculator" and a "motor restricted current calculator" included in the motor controller, as in the related art, are included in the "current feedback controller 60."

The current feedback controller 60 has, as a configuration of a general current feedback controller, a dq-axis current detection value calculator 61, a current deviation calculator 66, a dq-axis voltage instruction value calculator 67, a three-phase voltage instruction value calculator 68, a PWM converter 69 and the like.

The dq-axis current detection value calculator 61 calculates a d-axis current detection value Id_sns and a q-axis current detection value Iq_sns, by performing a three-phase two-phase coordinate conversion on the detection values Iu, Iv, Iw of the phase current detected by the current sensor 75 by using the electric angle θ. The current deviation calculator 66 calculates current deviations ΔId, ΔIq as differences between (i) the post-restriction dq-axis current instruction values Id and Iq output from the dq-axis current converter 570 and (ii) the dq-axis current detection values Id_sns, Iq_sns feedback from the dq-axis current detection value calculator 61.

The dq-axis voltage instruction value calculator 67 performs a PI calculation for the the d-axis current instruction value Id and the q-axis current instruction value Iq to follow the d-axis current detection value Id_sns and the q-axis current detection value Iq_sns, that is, in other words, for bringing the current deviations ΔId and ΔIq closer to zero. Then, the dq-axis voltage instruction value calculator 67 calculates the d-axis voltage instruction value Vd and the q-axis voltage instruction value Vq, which are target values of the output voltage of the inverter circuit 70.

Further, the dq-axis voltage instruction value calculator 67 according to the present embodiment converts the dq-axis voltage instruction values Vd and Vq to dq-axis duty ratios Dd and Dq according to equations (3.1) and (3.2) by using the inverter input voltage Vin. A conversion coefficient K of the equations (3.1) and (3.2) is used for the calculation of the q-axis current restriction value Id_lim and the d-axis current restriction value Id_lim by the dq-axis current restriction value calculator 63 described later.

[Equations 3.1, 3.2]

$$Dd = K \times \frac{Vd}{Vin} \quad (3.1)$$

$$Dq = K \times \frac{Vq}{Vin} \quad (3.2)$$

Thus, the dq-axis duty ratios Dd, Dq are, respectively, a correlation value of the dq-axis voltage instruction values Vd, Vq. However, in the specification of the present disclosure, the dq-axis duty ratios Dd, Dq are interpreted as "the dq-axis voltage instruction value" in a broader sense. Therefore, a portion where the current deviations ΔId and ΔIq are input and the dq-axis duty ratios Dd and Dq are output is referred to as the "dq-axis voltage instruction value calculator 67."

The three-phase voltage instruction value calculator 68 converts the dq-axis duty ratios Dd and Dq to three-phase duty ratios Du, Dv and Dw by two-phase three-phase coordinate conversion by using the electric angle θ. Similar to the "dq-axis voltage instruction value," the term a "three-phase voltage instruction value" is interpreted as including the three-phase duty ratios Du, Dv, Dw. The PWM converter 69 generates voltage pulse signals based on the three-phase duty ratios Du, Dv, and Dw as drive signals, and sends the signal as instructions to the inverter circuit 70. The switching operation of the inverter circuit 70 according to the drive signal causes the output voltage according to the voltage instruction value to be applied to the motor 80.

The target power source current calculator 62 calculates the target power source current Ibatt_lim, which is an upper limit value of the power source current Ibatt, based on the inverter input voltage Vin and the ambient temperature of the inverter circuit 70 by using a map or a mathematical equation. In the related art, the target power source current Ibatt_lim is set to increase as the inverter input voltage Vin increases, and is set to decrease as the ambient temperature increases.

The dq-axis current restriction value calculator 63 acquires the d-axis duty ratio Dd as a d-axis voltage instruction value, the q-axis duty ratio Dq as a q-axis voltage instruction value, the d-axis current detection value Id_sns or the q-axis current detection value Iq_sns, and the target power source current Ibatt_lim. Then, the dq-axis current restriction value calculator 63 calculates the q-axis current restriction value Iq_lim or the d-axis current restriction value Id_lim so that the power source current Ibatt becomes equal to or less than the target power source current Ibatt_lim based on those information input thereto.

The dq-axis current restriction value calculator 63 may primarily calculate the q-axis current restriction value Iq_lim only, and may calculate no d-axis current restriction value Id_lim. However, the dq-axis current restriction value calculator 63 may also calculate the d-axis current restriction value Id_lim. Here, for convenience of explanation, equations for calculating the q-axis current restriction value Iq_lim and for calculating the d-axis current restriction value Id_lim are collectively described.

More specifically, among five values acquired by the dq-axis current restriction value calculator 63, the d-axis current detection value Id_sns is required for the calculation of the q-axis current restriction value Iq_lim and the q-axis current detection values Id_sns is required for the calculation of the d-axis current restriction value Id_lim. In addition, the d-axis duty ratio Dd, the q-axis duty ratio Dq, and the target power source current Ibatt_lim are commonly required when calculating the q-axis current restriction value Iq_lim or the d-axis current restriction value Id_lim.

In deriving the equations for the dq-axis current restriction values Id_lim and Iq_lim, attention is drawn to an inverter power Winv. The inverter power Winv is equal to the sum of the products of the voltage and current of each of the d axis and the q axis. Further, an equation (4) can be obtained by substituting equations (3.1) and (3.2) to a d-axis voltage Vd and a q-axis voltage Vq.

[Equation 4]

$$Winv = Vd \times Id + Vq \times Iq = \left(\frac{Dd}{K} \times Id + \frac{Dq}{K} \times Iq\right) \times Vin \quad (4)$$

Here, based on an assumption that an input power which is a product of the power source current Ibatt and the inverter input voltage Vin is equal to the inverter power Winv, an equation (5) is established.

[Equation 5]

$$Ibatt = \frac{Winv}{Vin} = \frac{Dd}{K} \times Id + \frac{Dq}{K} \times Iq \quad (5)$$

Assuming that the power source current Ibatt is the target power source current Ibatt_lim and the d-axis current Id is the detected value Id_sns in the equation (5), an equation (6.1) for the q-axis current restriction value Iq_lim is obtained. Further, when assuming that the q-axis current Iq is the detected value Iq_sns, an equation (6.2) for the d-axis current restriction value Id_lim is obtained. The equations (6.1) and (6.2) are also known in the related art.

[Equations 6.1, 6.2]

$$Iq\_lim = \left(Ibatt\_lim - \frac{Dd}{K} \times Id\_sns\right) \times \frac{K}{Dq} \quad (6.1)$$

$$Id\_lim = \left(Ibatt\_lim - \frac{Dq}{K} \times Iq\_sns\right) \times \frac{K}{Dd} \quad (6.2)$$

The q-axis current restriction value Iq_lim and the d-axis current detection value Id_sns respectively calculated by the dq-axis current restriction value calculator 63 are input to the torque current converter 43, in the present embodiment. The specification and drawings in the following embodiments treat such a configuration as a basic assumption. In other embodiments, as described below, the d-axis current restriction value Id_lim and the q-axis current detection value Iq_sns in a broken line, respectively calculated by the dq-axis current restriction value calculator 63 are input to the torque current converter 43. In such a case, it can be understood that the d axis and the q axis in a primary embodiment are replaced with each other.

Subsequently, returning to FIG. 2, the configuration from the torque current converter 43 to the dq-axis current converter 570 is described. The torque current converter 43 converts the q-axis current restriction value Iq_lim to the torque current restriction value Itrq_lim by using the d-axis current detection value Id_sns. In other words, the torque current converter 43 calculates the torque current restriction value Itrq_lim based on the q-axis current restriction value Iq_lim and the d-axis current detection value Id_sns. The specific calculation configuration is described later with reference to FIG. 5. The torque current restriction value Itrq_lim takes a value that reflects the q-axis current restriction value Iq_lim calculated so that the power source current Ibatt becomes equal to or less than the target power source current Ibatt_lim.

The torque current restriction value filter 45 is a low-pass filter that receives the torque current restriction value Itrq_lim calculated by the torque current converter 43 and removes high frequency components higher than a predetermined cutoff frequency. The torque current restriction value filter 45 outputs a torque current restriction value Itrq_lim_LPF after the filtering process to the torque current instruction value restrictor 56. Thereby, a sudden change of the post-restriction torque current instruction value Itrq** is prevented.

Here, instead of or in addition to the torque current restriction value filter 45, a q-axis current restriction value filter may be provided which removes high frequency components using, as an input thereto, the q-axis current restriction value Iq lim calculated by the dq-axis current restriction value calculator 63. However, in terms of logic configuration, it may be more preferable to provide a filter for the torque current restriction value Itrq_lim that is close to the final output. In addition, the current restriction value filter may be dispensed, if, for example, avoidance of the sudden change of the post-restriction torque current instruction value Itrq** is not taken into consideration.

Torque current instruction value restrictor 56 restricts the torque current instruction value Itrq* converted from the torque instruction value required for the motor by the torque current restriction value Itrq_lim, and outputs the post-restriction torque current instruction value Itrq to the dq-axis current converter 570. The dq-axis current converter 570 converts the post-restriction torque current instruction value Itrq to a d-axis current instruction value Id and a q-axis current instruction value Iq.

Next, the detailed configurations of the d-axis current instruction value calculator 47 and the q-axis current converter 58 in the dq-axis current converter 570 are described with reference to FIG. 4. The d-axis current instruction value calculator 57 includes a d-axis current instruction value map 573 and an arbitration calculator 574. The d-axis current instruction value map 573 calculates a torque current based d-axis current instruction value Id_trq* that realizes an optimum advance angle amount according to the post-restriction torque current instruction value Itrq**. Note that the d-axis current instruction value Id_trq* is a negative value, and the value becomes smaller (i.e., the absolute value of Id_trq* becomes greater) as the post-restriction torque current instruction value Itrq** becomes greater.

On the other hand, the d-axis current instruction value calculator 57 acquires the d-axis current instruction value Id_wf* for field weakening. The d-axis current instruction value Id_wf* for field weakening is used as an instruction for the motor 80 in accordance with the rotational speed of the motor 80 and/or the degree of saturation with respect to the maximum applied voltage applied to the motor 80. The arbitration calculator 574 arbitrates the torque current based d-axis current instruction value Id_trq* and the field-weakening d-axis current instruction value Id_wf*, and outputs the post-restriction d-axis current instruction value Id**. For example, the arbitration calculator 574 selects a d-axis current instruction value having a smaller value (i.e., having a greater absolute value).

The q-axis current converter 58 converts the post-restriction torque current instruction value Itrq to the post-restriction q-axis current instruction value Iq, by using the post-restriction d-axis current instruction value Id calculated by the d-axis current instruction value calculator 57. For example, the q-axis current converter 58 calculates the post-restriction q-axis current instruction value Iq by performing a three-dimensional map calculation that uses two arguments of the post-restriction torque current instruction value Itrq and the post-restriction d-axis current instruction value Id. Such a map calculation corresponds to an inverse calculation of the map calculation of the torque current converter 43 shown in FIG. 5. Further, the q-axis current converter 58 may calculate the post-restriction q-axis current instruction value Iq** by polynomial calculation according to the torque current converter 43 of the second embodiment.

As described above, the motor controller 101 according to the present embodiment restricts the torque current instruction value Itrq* by the torque current restriction value Itrq_lim converted from the q-axis current restriction value Iq_lim by using the torque current Itrq proportional to the torque of the motor 80. Therefore, the power source current Ibatt can be appropriately restricted even when the controller 101 is applied to an IPM motor that generates a reluctance torque that depends on both of the d-axis current Id and the q-axis current Iq. The effects of the motor controller 101 are particularly advantageously exhibited in the electric power steering device 90 that is required to achieve both of volume/size reduction and durability to high current at the time of abrupt steering.

Figure 5:
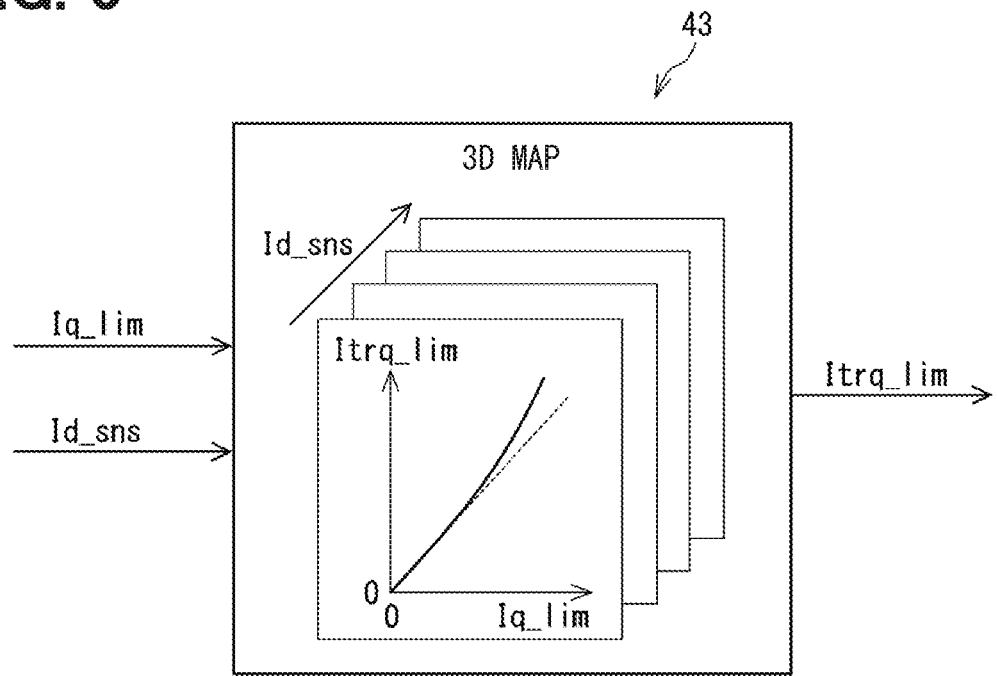
FIG. 5 is a diagram of a calculation configuration of a torque current converter in the first embodiment.

Next, with reference to FIG. 5, a specific calculation configuration of the torque current converter 43 of the first embodiment is described. The torque current converter 43 of the first embodiment calculates the torque current restriction value Itrq_lim by the three-dimensional map calculation that uses two arguments of the q-axis current restriction value Iq_lim and the d-axis current detection value Id_sns.

For example, as the three-dimensional map, a plurality of two-dimensional maps of the q-axis current restriction value Iq_lim versus the torque current restriction value Itrq lim are prepared in accordance with a plurality of typical d-axis current Id values. Then, the torque current restriction values Itrq_lim corresponding to a d-axis current detection value Id_sns is calculated by performing a linear interpolation of the two torque current restriction values Itrq_lim that are obtained from the q-axis current restriction values Iq_lim in the two maps respectively corresponding to the d-axis currents Id before and after the d-axis current detection values Id_sns. As described above, in the first embodiment, by using the three-dimensional map, the torque current restriction value Itrq_lim can be efficiently calculated while reducing the load of calculation processing.

Second Embodiment

Figure 6:
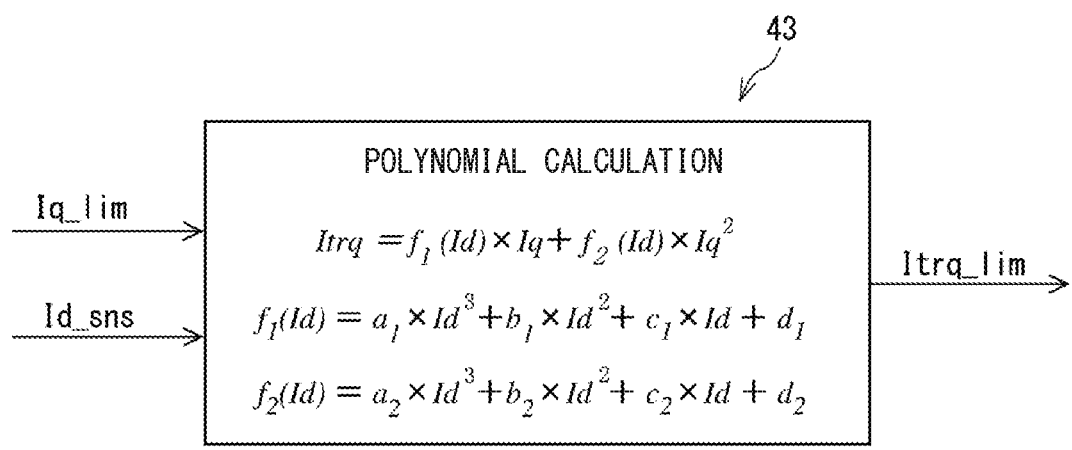
FIG. 6 is an illustration of a calculation configuration of the torque current converter in the second embodiment.

The second embodiment in which the calculation configuration of the torque current converter 43 is different from the first embodiment is described with reference to FIG. 6. The torque current converter 43 of the second embodiment calculates the torque current restriction value Itrq_lim by performing a polynomial calculation on the q-axis current restriction value Iq_lim and the d-axis current detection value Id_sns. Here, equations (7.1) to (7.3) are shown as an example of a polynomial.

[Equations 7.1, 7.2, 7.3]

$$Itrq = f_1(Id) \times Iq + f_2(Id) \times Iq^2 \quad (7.1)$$

$$f_1(Id) = a_1 \times Id^3 + b_1 \times Id^2 + c_1 \times Id + d_1 \quad (7.2)$$

$$f_2(Id) = a_2 \times Id^3 + b_2 \times Id^2 + c_2 \times Id + d_2 \quad (7.2)$$

In the following description of the polynomials, the names and symbols of the parts of "restriction value (_lim)" and "detected value (_sns)" are omitted. In this example, as shown in the equation (7.1), a torque current Itrq is calculated as a sum of a linear term and a squared term of the q-axis current Iq. A coefficient f1(Id) of the linear term and a coefficient f2(Id) of the squared term are functions of the d-axis current Id, and, according to the equations (7.2) and (7.3), both are represented by cubic equations of the d-axis current Id. The polynomial approximation coefficients a1, b1, c1, d1, a2, b2, c2 and d2 of each of the two equations are determined based on the data of the torque current Itrq converted from the measured torque at a plurality of dq-axis current points.

In case of the IPM motor, although the value of the squared term of the q-axis current Iq is smaller than the value of the linear term in the equation (7.1), the value of the squared term is not ignorable depending on the value of the d-axis current Id, since it may range from a few percentage to dozens of percentage relative to the value of the linear term. Therefore, in the second embodiment, the torque current restriction value Itrq_lim can be calculable with high accuracy by performing the polynomial calculation on the q-axis current restriction value Iq_lim and the d-axis current detection value Id_sns. Note that the order of the polynomial may be set appropriately according to the required accuracy and the arithmetic processing capacity of the processors.

Third Embodiment

The third embodiment is described with reference to FIG. 7 to FIG. 10. The related art includes a filter for removing a high frequency component of a predetermined frequency or more is provided at an input part and an output part of a dq-axis current restriction value calculator to suppress a sudden change of the current restriction value. However, the characteristics of the filter are constant, and adjustment according to the situation is not considered. Therefore, there may be a risk that the driver's steering feel may be reduced if the responsiveness is lowered by always giving priority to the suppression of the power source current Ibatt. Therefore, in the third embodiment, the filter characteristics are switched according to the presence or absence of the necessity of suppressing the sudden change of the torque current restriction value Itrq_lim.

Figure 7:
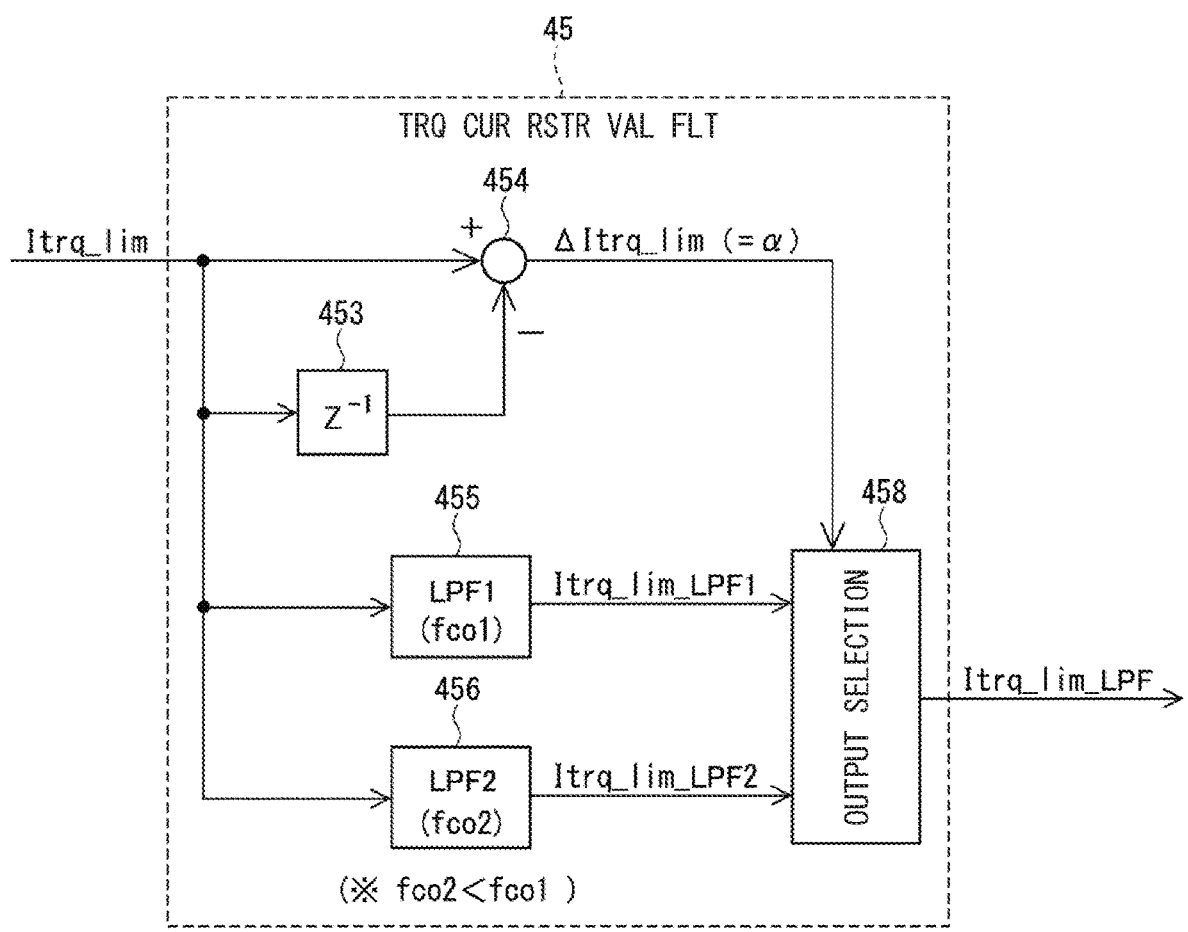
FIG. 7 is a control block diagram of a torque current restriction value filter in the third embodiment.
Figure 8:
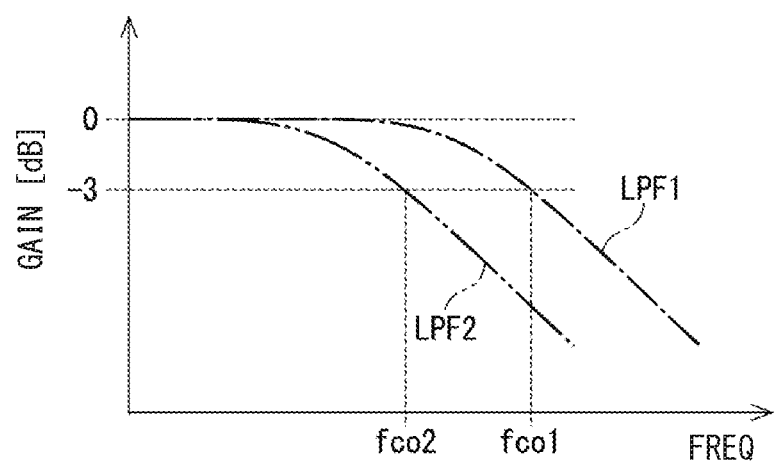
FIG. 8 is a frequency characteristic diagram of the torque current restriction value filter.

As shown in FIG. 7, the torque current restriction value filter 45 includes two low-pass filters respectively having different cutoff frequencies, i.e., a first low-pass filter ("LPF 1" in the drawing) 455 and a second low-pass filter ("LPF 2" in the drawing) 456. A cutoff frequency fco1 of the first LPF 455 is set to a value higher than a cutoff frequency fco2 of the second LPF 456. That is, the frequency characteristics of the first LPF 455 and the second LPF 456 are set as shown in FIG. 8.

Further, an input delay element 453 holds a previous value of the torque current restriction value Itrq lim, and a difference calculator 454 calculates a difference ΔItrq_lim between the previous value and the current value of the torque current restriction value. Hereinafter, the difference ΔItrq_lim is referred to as a "differential value α." The differential value α is input to an output selector 458.

The output selector 458 selects one of a first post-filtering torque current restriction value Itrq_lim_LPF1 output by the first LPF 455 or a second post-filtering torque current restriction value Itrq_lim_LPF2 output by the second LPF 456 according to the differential value α, and outputs a selected value as a post-filtering torque current restriction value Itrq_lim_LPF.

Figure 9:
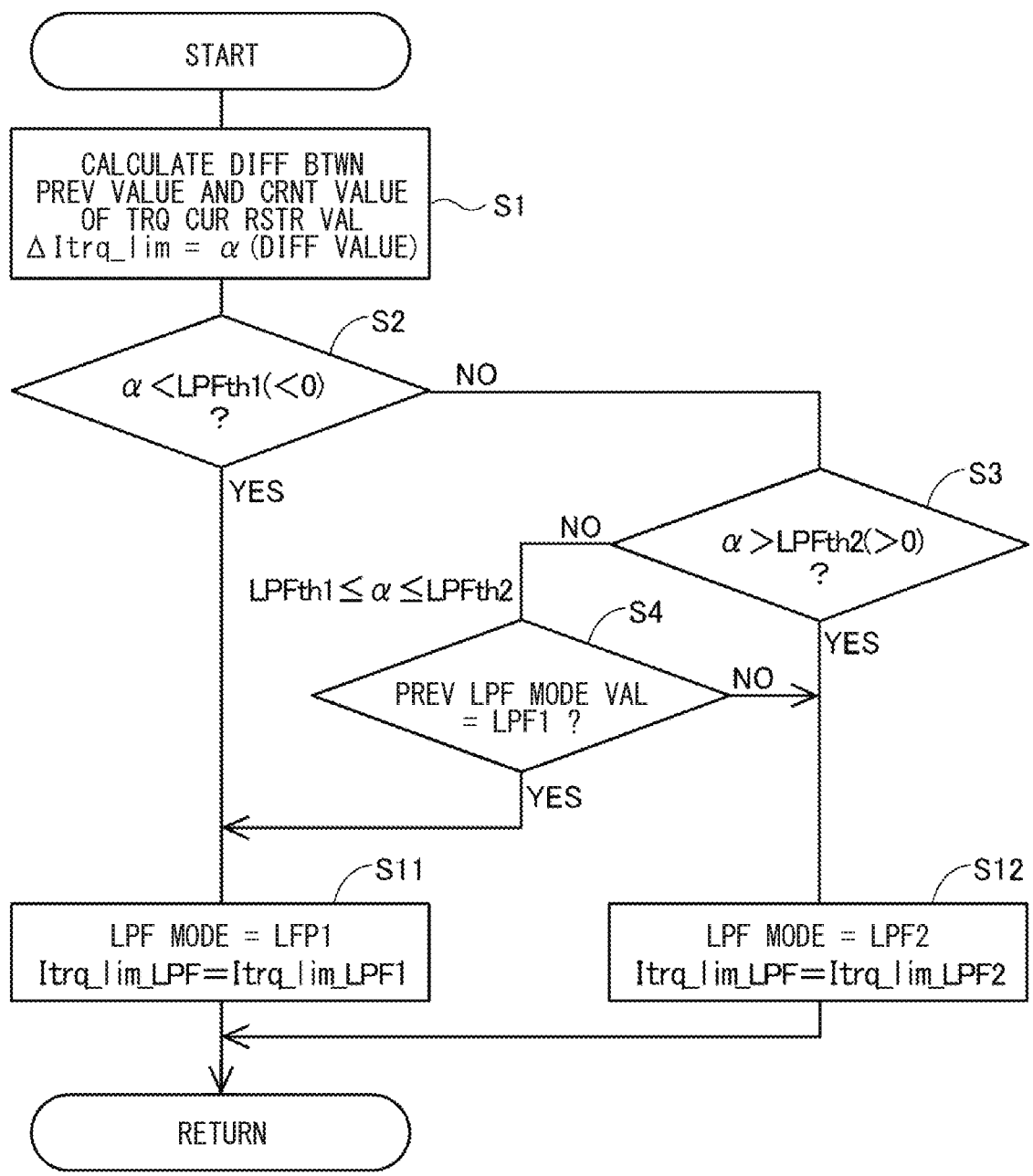
FIG. 9 is a flowchart of an output selection process by the torque current restriction value filter.

The selection process by the output selector 458 is shown in the flowchart of FIG. 9. In the description of the flowchart, a symbol "S" indicates a step. In S1, the difference calculator 454 calculates the difference ΔItrq_lim between the previous value and the current value of the torque current restriction value, and sets the difference as the "differential value α."

In S2, it is determined whether the differential value α is smaller than a negative threshold LPFth1. In case of YES in S2, it is determined that the torque current restriction value Itrq_lim is clearly decreasing, and the process proceeds to S11. In case of NO in S2, it is determined in S3 whether the differential value α is greater than a positive threshold LPFth2. In case of YES in S3, it is determined that the torque current restriction value Itrq_lim is clearly increasing, and the process proceeds to S12. For example, the negative threshold LPFth1 is set to −5 [A], and the positive threshold LPFth2 is set to 5 [A].

In S11, the output selector 458 sets a LPF mode as LPF1, and selects the output Itrq_lim_LPF1 of the first LPF 455 as the post-filtering torque current restriction value Itrq_lim_LPF. In S12, the output selector 458 sets the LPF mode to LPF2, and selects the output Itrq_lim_LPF2 of the second LPF 456 as the post-filtering torque current restriction value Itrq_lim_LPF.

As described above, the torque current restriction value filter 45 in the third embodiment switches the cutoff frequency to be used in a filter input decreasing time and in a filter input increasing time, i.e., when the torque current restriction value Itrq_lim, which is an input of the filter, is increasing and decreasing. The first cutoff frequency fco1 used in the input decreasing time is set to a value higher than the second cutoff frequency fco2 used in the input increasing time. That is, the responsiveness is relatively high when the torque current restriction value Itrq_lim decreases, and the responsiveness is relatively low when the torque current restriction value Itrq_lim increases.

In case of NO in S3, the differential value α is in a range from the negative threshold LPFth1 to the positive threshold LPFth2, and such a range is regarded as a "dead zone," and it is considered that the torque current restriction value Itrq_lim is not substantially changed. In such a case, it is determined in S4 whether the previous value of the LPF mode is LPF1. In case of YES in S4, the process proceeds to S11, and in case of NO in S4, the process proceeds to S12. That is, the previously selected LPF mode is maintained.

As the treatment of the dead zone, priority may be given to LPF1 or LPF2 in the LPF mode for selection among the two. Alternatively, from the viewpoint of device protection, the smaller value of the two filter outputs Itrq_lim_LPF1 and Itrq_lim_LPF2 may be selected. Further, when the dead zone is not provided, the thresholds of S2 and S3 may be set to "LPFth1=LPFth2=0."

Figure 10:
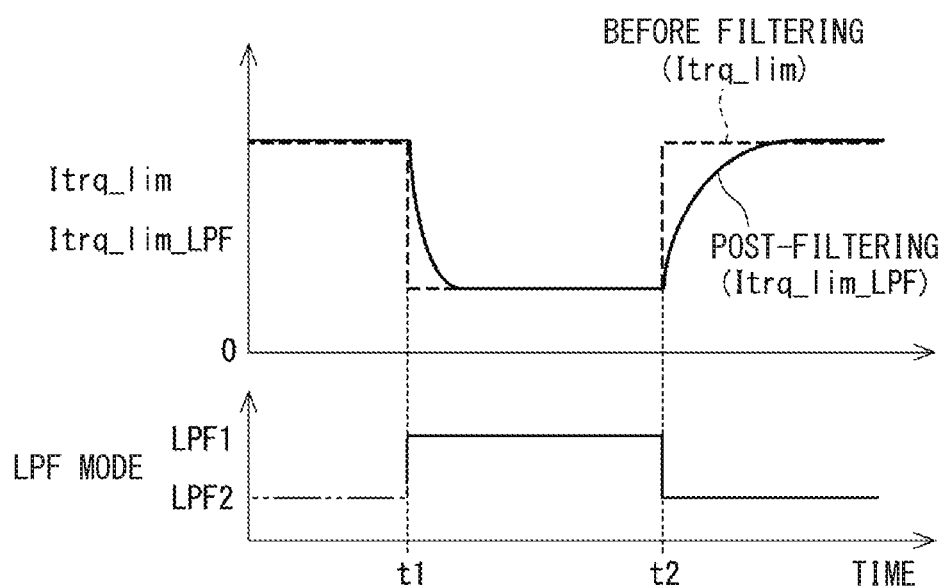
FIG. 10 is a time chart of an operation in the third embodiment.

The operation according to the third embodiment is shown in the time chart of FIG. 10. The torque current restriction value Itrq_lim before filtering is shown by a broken line, and the post-filtering torque current restriction value Itrq_lim_LPF is shown by a solid line. Although the LPF mode before time t1 may either be LPF1 or LPF2, it is assumed here that it is LPF2 as shown by a two-dot chain line.

When the torque current restriction value Itrq_lim before filtering decreases at time t1, the output selector 458 selects the output Itrq_lim_LPF1 of the first LPF 455 using the relatively high cutoff frequency fco1. As a result, the LPF mode becomes LPF1, and the post-filtering torque current restriction value Itrq_lim_LPF decreases relatively quickly. Thereby, in a situation where it is necessary to suppress the power source current Ibatt to an upper limit of durability or less, priority may be given to enhancing the responsiveness of the feedback control and to rapidly reduce the output of the inverter circuit 70.

When the torque current restriction value Itrq_lim before filtering increases at time t2, the output selector 458 selects the output Itrq_lim_LPF2 of the second LPF 456 using the relatively low cutoff frequency fco2. As a result, the LPF mode becomes LPF2, and the post-filtering torque current restriction value Itrq_lim_LPF increases relatively gently. Thus, in a situation where it is not necessary to suppress the power source current Ibatt, priority may be given to alleviating the change to such an extent that the driver's steering feel is not reduced.

As described above, in the third embodiment, protection of the motor controller 101 by suppression of the power source current Ibatt and steering feel of the driver are appropriately balanced by switching the cutoff frequency when the torque current restriction value Itrq_lim decreases and increases. Note that the cutoff frequency may be switched not only between the decrease time and the increase time of the torque current restriction value Itrq_lim, but may also be switched by a current restriction value filter between the decrease time and the increase time of the q-axis current restriction value Iq_lim that is input to the current restriction value filter.

Fourth Embodiment

The fourth embodiment is described with reference to FIG. 11 to FIG. 14. In the fourth embodiment, for the same purpose as the third embodiment, a torque current restriction value selector 46 is provided which selects an output according to the decrease or increase of the torque current restriction value Itrq_lim. Moreover, for supplementing a character of the third embodiment, in which rising slope of the output in an input increase time just after the switching of the cutoff frequency may not be sufficiently suppressed, the configuration in the fourth embodiment positively restricts the amount of change in the output immediately after the increase of the input has started. In particular, in the fourth embodiment, linear processing is performed to make a per-unit-time increase of the output constant, with respect to (i.e., in contrast to) the following fifth embodiment.

In the fourth embodiment, the torque current restriction value filter 45 in FIG. 2 describing the configuration of the motor controller 101 is replaced with the torque current restriction value selector 46. The post-filtering torque current restriction value Itrq_lim_LPF input to the torque current instruction value restrictor 56 is replaced with a selected torque current restriction value Itrq_lim_sel which is the output of the torque current restriction value selector 46.

Figure 11:
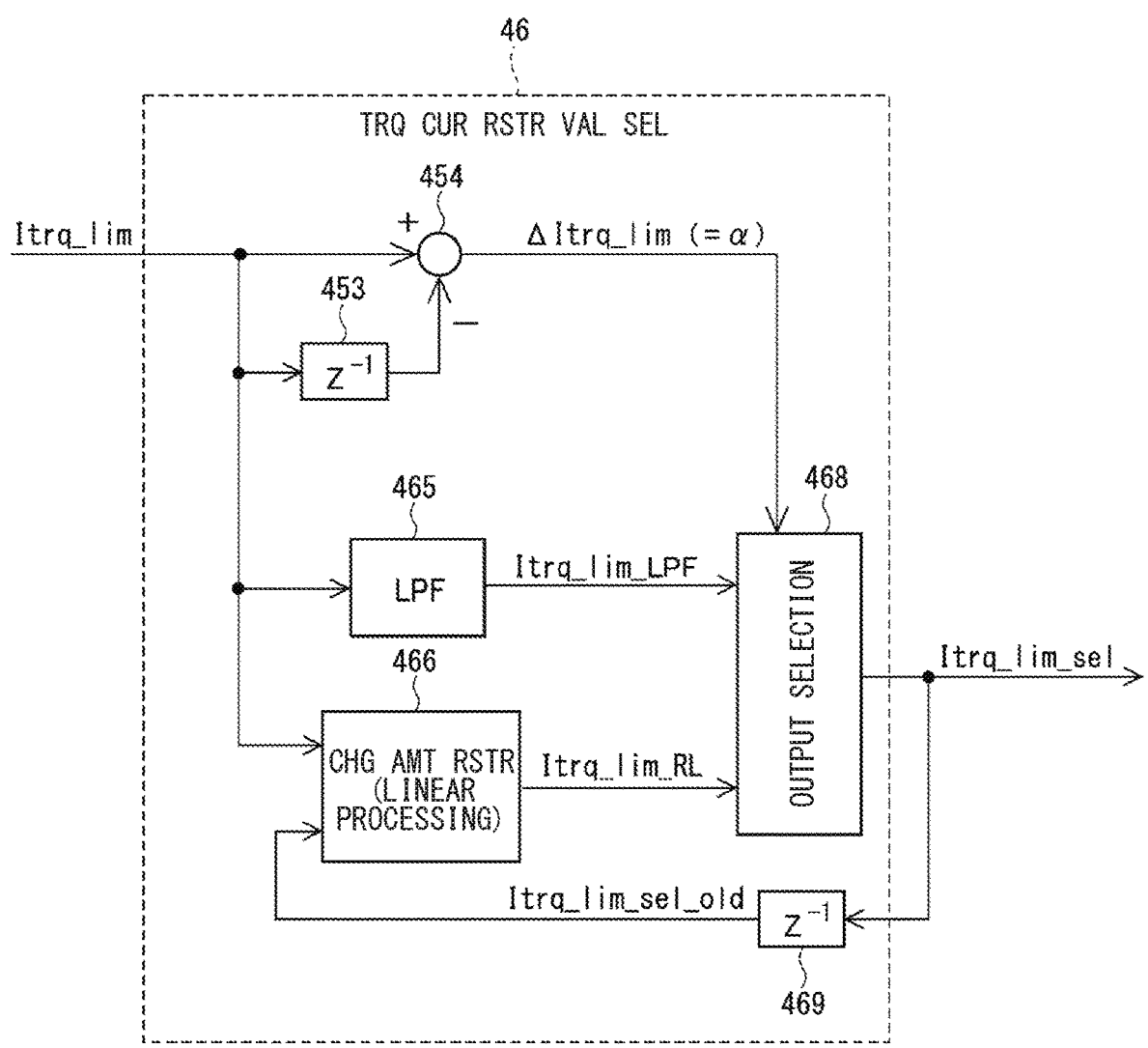
FIG. 11 is a control block diagram of a torque current restriction value selector in the fourth embodiment.

In the control block diagram of the torque current restriction value selector 46 shown in FIG. 11, the same reference numerals are assigned to the same, or substantially same, components in FIG. 7 of the third embodiment, and a description thereof is omitted. More specifically, the configuration with which the difference ΔItrq_lim calculated by the input delay element 453 and the difference calculator 454 is input to an output selector 468 as the "differential value α" is the same as the third embodiment.

In addition, the torque current restriction value selector 46 includes a low-pass filter (LPF) 465, a change amount restrictor 466, the output selector 468, and an output delay element 469. The LPF 465, serving as the "torque current restriction value filter" in the fourth embodiment, outputs the post-filtering torque current restriction value Itrq_lim_LPF from which high frequency components higher than a predetermined cutoff frequency in the input are removed. The cutoff frequency of the LPF 465 is set, for example, substantially to the same level as the cutoff frequency fco1 of the first LPF 455 of the third embodiment.

The change amount restrictor 466 calculates and outputs a change-amount-restricted torque current restriction value Itrq_lim_RL after the change amount restriction in which the change amount at an input increase time is restricted based on the torque current restriction value Itrq_lim and the previous value Itrq_lim_sel_old of the selected torque current restriction value. The symbol "RL" at the end of the symbol is derived from "Rate Limit." Details of the calculation of the change-amount-restricted torque current restriction value Itrq_lim_RL are described later with reference to the sub-flowchart of FIG. 13.

The output selector 468 selects either the post-filtering torque current restriction value Itrq_lim_LPF output by the LPF 465 or the change-amount-restricted torque current restriction value Itrq_lim_RL output by the change amount restrictor 466 according to the differential value α, and output selection as the selected torque current restriction value Itrq_lim_sel.

Figure 12:
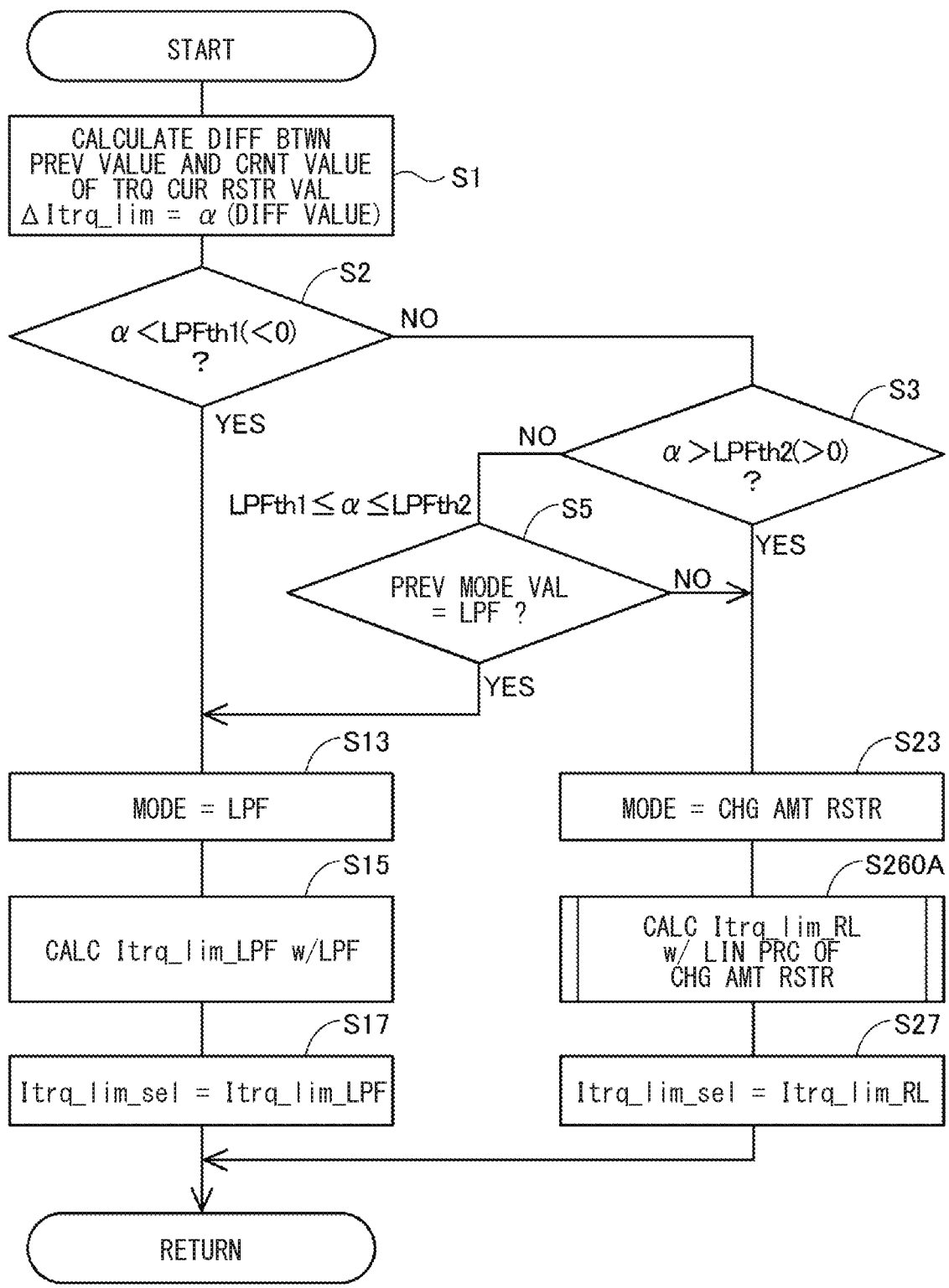
FIG. 12 is a flowchart of the output selection process in the fourth embodiment.

The flowchart of FIG. 12 shows a selection process performed by the output selector 468. S1 to S3 are the same as the ones in FIG. 9 of the third embodiment. When the torque current restriction value Itrq_lim is clearly decreasing, it is determined as YES in S2, and the process proceeds to S13. In S13, the mode is set to the LPF mode. When the torque current restriction value Itrq_lim is clearly increasing, it is determined as YES in S3, and the process proceeds to S23. In S23, the mode is set to a change amount restriction mode. If S3 is NO, it is determined in S5 whether the previous mode value is LPF. If S5 is YES, the process proceeds to S13, and if S5 is NO, the process proceeds to S23. That is, the previously selected mode is maintained. In addition, the other examples of treatment in the dead zone conform to the ones in the third embodiment.

In S15 subsequent to S13, the LPF 465 calculates the post-filtering torque current restriction value Itrq_lim_LPF. In S17, the output selector 468 selects the post-filtering torque current restriction value Itrq_lim_LPF as the selected torque current restriction value Itrq_lim_sel.

In S260A subsequent to S23, the change amount restrictor 466 performs "linear processing" to calculate the change-amount-restricted torque current restriction value Itrq_lim_RL. In the linear processing, the increase of the output per unit time, or more specifically, the increase of the output per one calculation cycle is set to be constant. In S27, the output selector 468 selects the change-amount-restricted torque current restriction value Itrq_lim_RL as the selected torque current restriction value Itrq_lim_sel.

Figure 13:
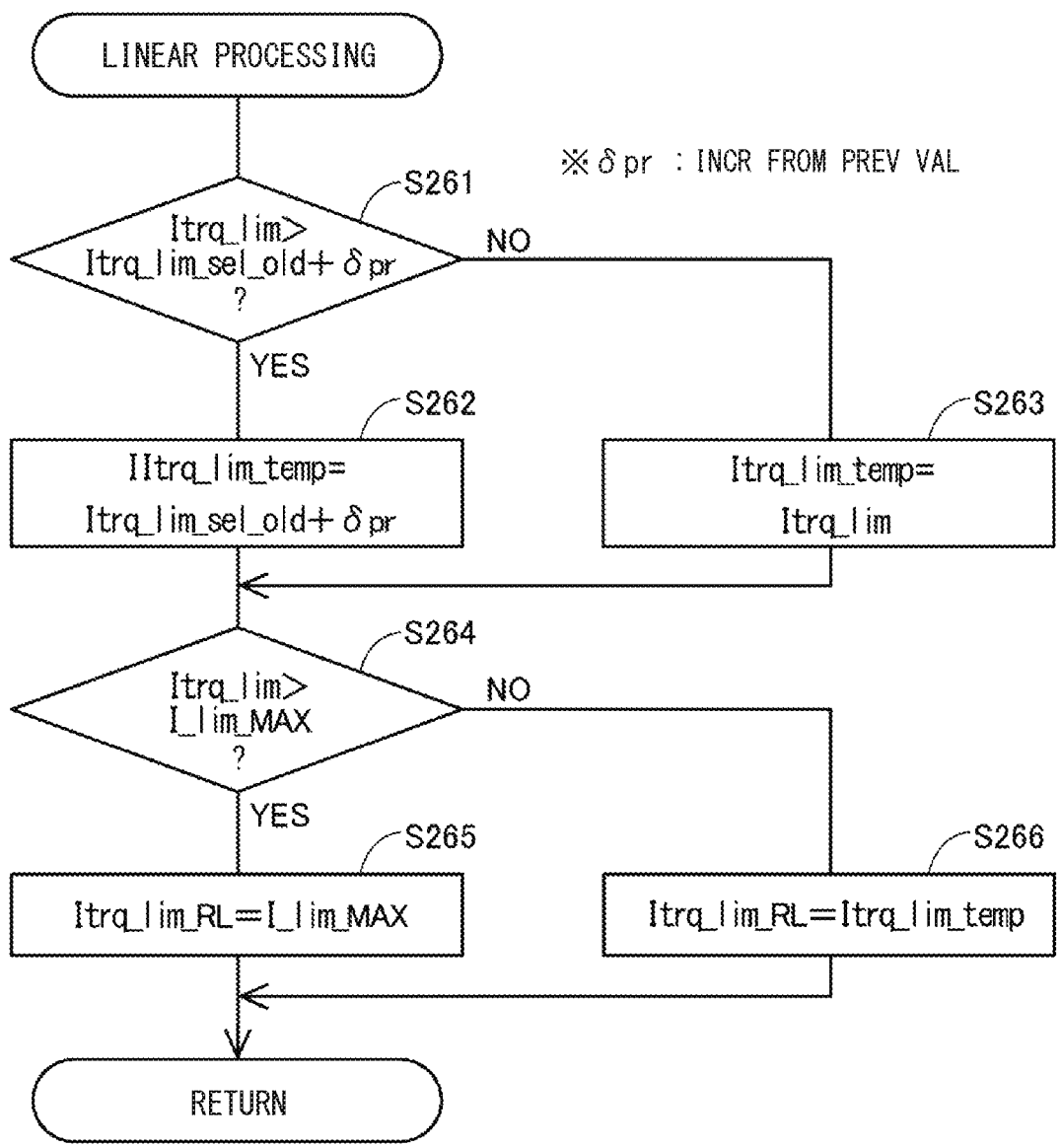
FIG. 13 is a sub-flowchart of linear processing of FIG. 12.

The sub-flowchart of FIG. 13 shows the details of the linear processing performed by the change amount restrictor 466. Here, an increase per calculation cycle with reference to the previous value Itrq_lim_sel_old of the selected torque current restriction value is designated as "δpr." In the linear processing, the current output range is restricted by a value obtained by adding a constant increase δpr to the previous output. Since the torque current restriction value Itrq_lim is defined as a positive value, the output range is restricted only on the positive side.

In S261 to S263, the torque current restriction value Itrq_lim is compared with "Itrq_lim_sel_old+δpr" obtained by adding the increase δpr to the previous output value, and the smaller one is set as a temporary torque current restriction value Itrq_lim_temp. If the torque current restriction value Itrq_lim is greater, it is determined as YES in S261, and "Itrq_lim_sel_old+δpr" is set to the temporary torque current restriction value Itrq_lim_temp in S262. If the torque current restriction value Itrq_lim is equal to or smaller, it is determined as NO in S261, and the torque current restriction value Itrq_lim is set to the temporary torque current restriction value Itrq_lim_temp in S263.

Next, in S264, it is determined whether the torque current restriction value Itrq_lim is greater than a current upper limit value I_lim_MAX of the circuit (i.e., "current" in this case means "electric current"). If S264 is YES, the current upper limit value I_lim_MAX is set to the change-amount-restricted torque current restriction value Itrq_lim_RL in S265. If S264 is NO, the temporary torque current restriction value Itrq_lim_temp is set to the change-amount-restricted torque current restriction value Itrq_lim_RL in S266. That is, the upper limit of the change-amount-restricted torque current restriction value Itrq_lim_RL is guarded by the current upper limit value I_lim_MAX.

Figure 14:
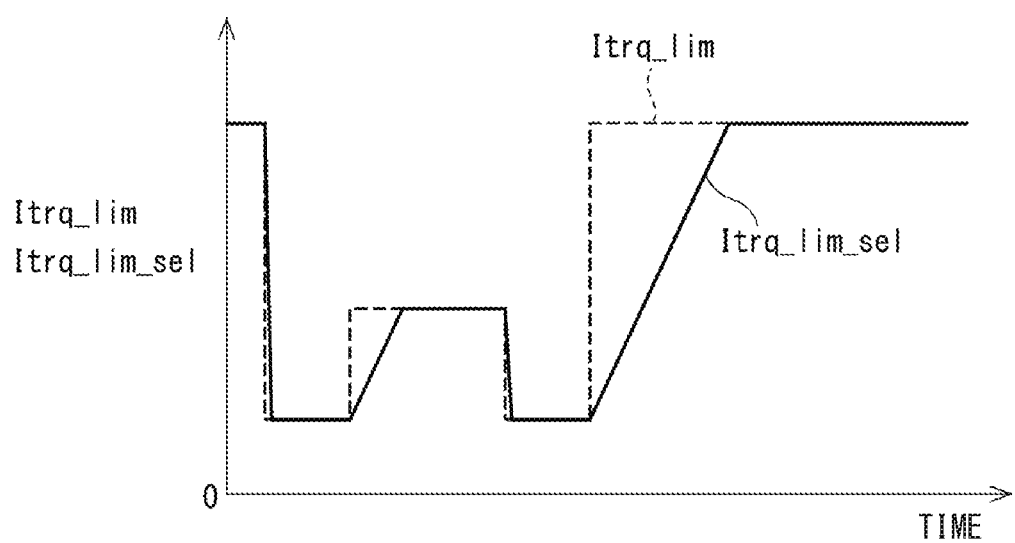
FIG. 14 is a time chart of an operation in the fourth embodiment.

The operation according to the fourth embodiment is shown in the time chart of FIG. 14. The torque current restriction value Itrq_lim input to the torque current restriction value selector 46 is indicated by a broken line, and the selected torque current restriction value Itrq_lim_sel output by the torque current restriction value selector 46 is indicated by a solid line. The torque current restriction value selector 46 makes the output quickly follow the target value by selecting the post-filtering torque current restriction value Itrq_lim_LPF on an input decreasing side, i.e., when the electric current is restricted. On the other hand, on the other side where the input increases, i.e., when the restriction on the electric current is released, the torque current restriction value selector 46 selects the change-amount-restricted torque current restriction value Itrq_lim_RL, thereby controlling the output to mildly follow the target value without incongruity.

The first-order delay characteristic of the LPF 465 in FIG. 14 is represented only by a slight slope from verticality, i.e., at two falling edges. There is a design limitation even if the time constant of the LPF 465 is adjusted by the capacitance of the circuit or the like. On the other hand, in the change amount restriction by the change amount restrictor 466, by adjusting the increase δpr of the output per unit time, the degree of freedom in the change amount restriction range can be increased. Therefore, both of (i) the protection of the motor controller 101 by the suppression of the power source current Ibatt and (ii) the steering feel of the driver can be suitably established without compromise. Further, in the fourth embodiment, the linear processing is performed by using the constant increase δpr, thereby the calculation load of the change amount restrictor 466 is reducible.

Fifth Embodiment

The fifth embodiment is described with reference to FIG. 15 to FIG. 18. The fifth embodiment is different from the fourth embodiment only in the method of calculating the change-amount-restricted torque current restriction value Itrq_lim_RL by a change amount restrictor 476 of a torque current restriction value selector 47. That is, the change amount restrictor 476 according to the fifth embodiment performs a graduated increase process to incrementally increase a per-unit-time increase of the output. The differences from the fourth embodiment will mainly be described below.

Figure 15:
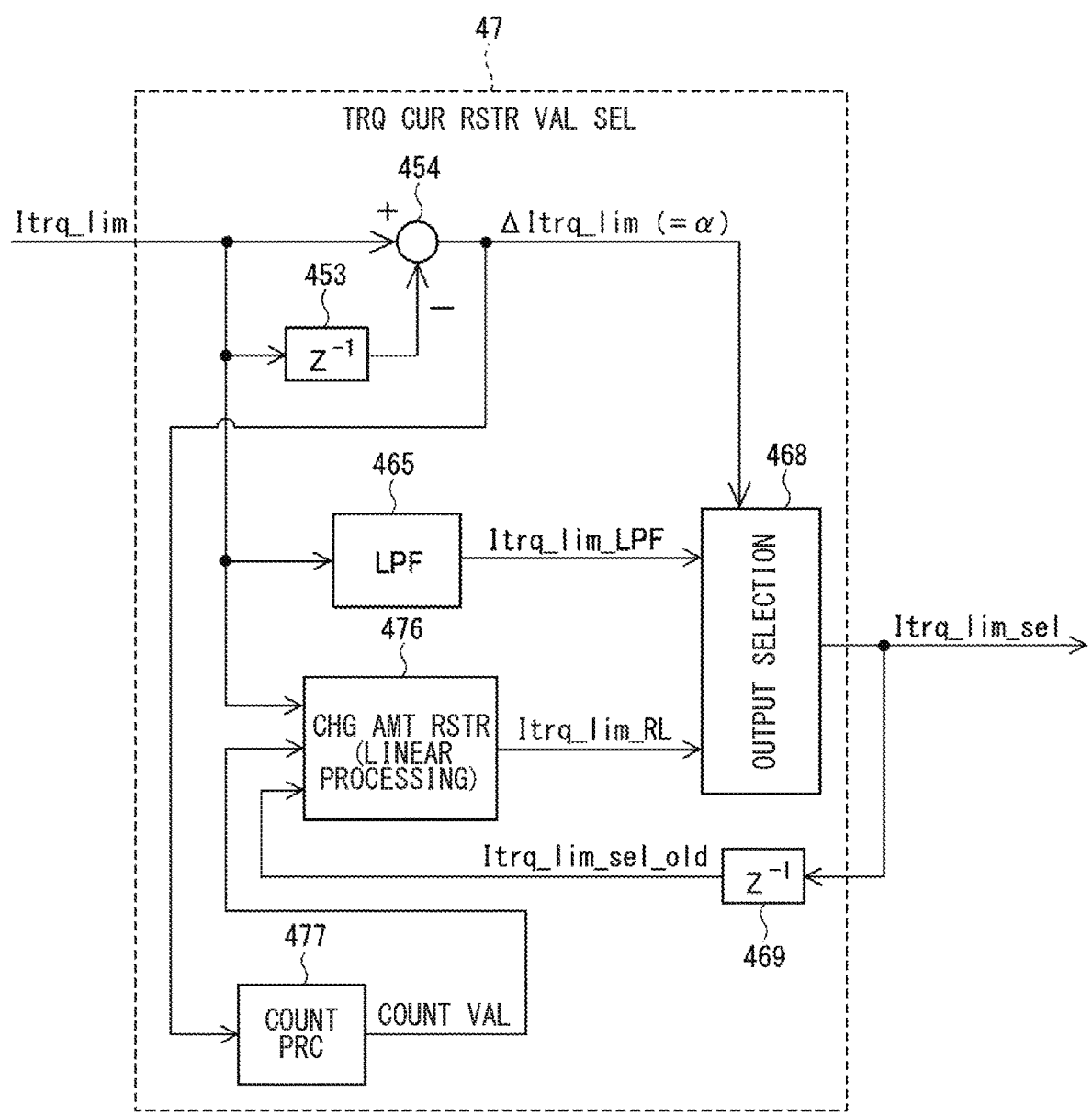
FIG. 15 is a control block diagram of the torque current restriction value selector in the fifth embodiment.

In the control block diagram of the torque current restriction value selector 47 shown in FIG. 15, the same reference numerals of the fourth embodiment denote the configurations substantially same as the ones in FIG. 11. As a configuration different from the fourth embodiment, the torque current restriction value selector 47 of the fifth embodiment includes the change amount restrictor 476 performing the "gradual increase process" and the count processor 477 counting a total calculation count of the differential value α.

The change amount restrictor 476 calculates and outputs the change-amount-restricted torque current restriction value Itrq_lim_RL, which is derived by restricting the change amount at the input increase time, based on the torque current restriction value Itrq_lim, the count value by the count processor 477, and the previous value of the selected torque current restriction value Itrq_lim_sel_old. Details of the calculation of the change-amount-restricted torque current restriction value Itrq_lim_RL are described later with reference to the sub-flowchart of FIG. 17.

The output selector 468 selects either the post-filtering torque current restriction value Itrq_lim_LPF output by the LPF 465 or the change-amount-restricted torque current restriction value Itrq_lim_RL output by the change amount restrictor 476 according to the differential value α, and outputs selection as the selected torque current restriction value Itrq_lim_sel.

Figure 16:
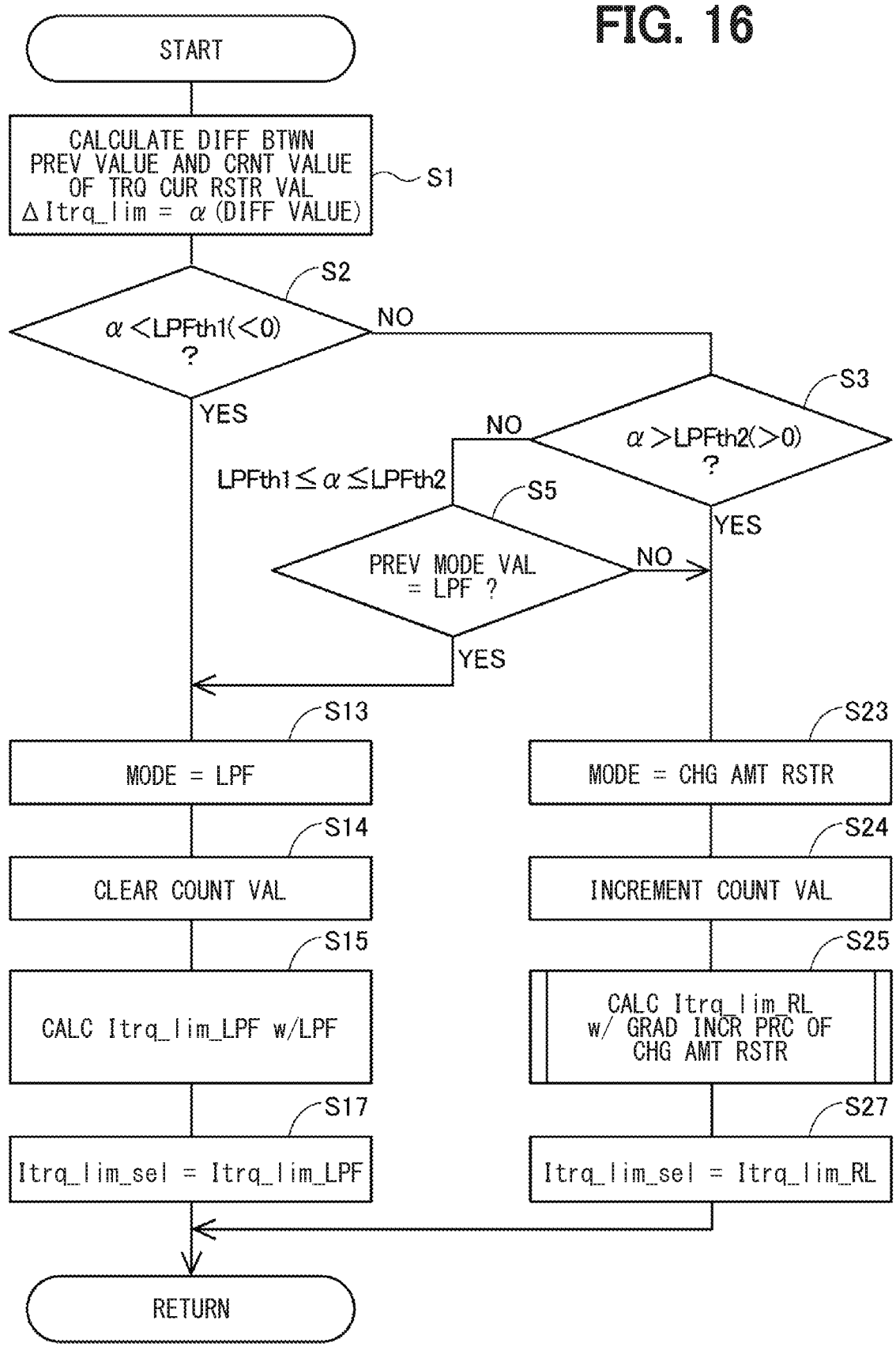
FIG. 16 is a flowchart of the output selection process in the fifth embodiment.

The selection process performed by the output selector 468 is shown in the flowchart of FIG. 16. FIG. 16 is different from FIG. 12 of the fourth embodiment in that S14 and S24 are added thereto, and S260B is performed instead of S260A. If S2 is YES, after the mode is set to the LPF mode in S13, the count value is cleared in S14. If S3 is YES, after the mode is set to the change amount restriction mode in S23, the count value is incremented in S24. Thus, the count value is proportional to an elapsed time from the time of entering the change amount restriction mode. In S260B, the change amount restrictor 476 performs the "gradual increase process" to calculate a change-amount-restricted torque current restriction value Itrq_lim_RL. In the gradual increase process, the per-unit-time increase of the output is gradually, or incrementally, increased.

Figure 17:
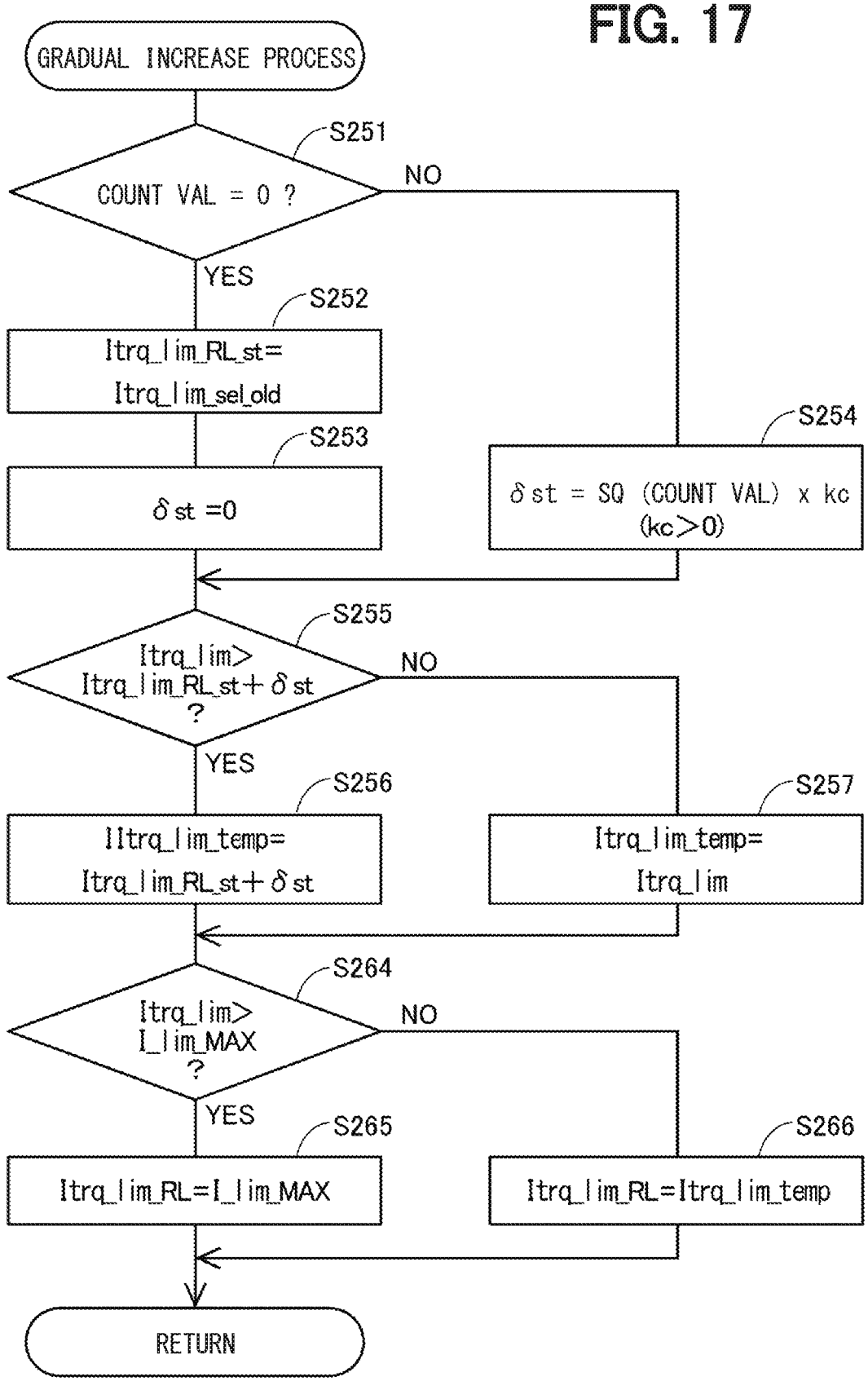
FIG. 17 is a sub-flowchart of a gradual increase process of FIG. 16.

The sub-flowchart of FIG. 17 shows the details of the gradual increase process performed by the change amount restrictor 476. Here, an increase with reference to an initial value Itrq_lim_RL_st of the change-amount-restricted torque current restriction value is designated as "δst." In the gradual increase process, δst(t), which is a function of time t, has a positive first-order differential value and a positive second-order differential value in the range of "t>0." In FIG. 17, δst(t) is shown as an example of a quadratic function. In addition, δst(t) may also be a power function greater than the first order such as the 1.5th or 3rd order, or may be a function other than that.

In S251, it is determined whether the count value is 0, that is, whether it is the first time of processing, or whether it is the first time of processing after reset. If S251 is YES, the previous value Itrq_lim_sel_old of the selected torque current restriction value is set as the initial value Itrq_lim_RL_st of the change-amount-restricted torque current restriction value in S252. Then, in S253, the increase δst measured with reference to the initial value is set to zero.

On the other hand, if S251 is NO, the increase δst is calculated as "square of (count value)×kc" in S254. Here, kc is a positive constant. Thus, the increase δst is calculated as a quadratic function of the count value which is a time correlation value. If the other function is used, the equation in S254 may be changed as appropriate. Alternatively, it may be calculated by map calculation.

In S255 to S257, the torque current restriction value Itrq_lim is compared with "Itrq_lim_RL_st+δst" obtained by adding the increase δst to the initial value, and the smaller one is set to the temporary torque current restriction value Itrq_lim_temp. When the torque current restriction value Itrq_lim is greater, it is determined as YES in S255, and in S256, "Itrq_lim_RL_st+δst" is set to the temporary torque current restriction value Itrq_lim_temp. If the torque current restriction value Itrq_lim is equal to or smaller, it is determined as NO in S255, and the torque current restriction value Itrq_lim is set to the temporary torque current restriction value Itrq_lim_temp in S257. The subsequent steps S264, S265, and S266 thereafter are the same as those in FIG. 13 of the fourth embodiment, and thus the description thereof is omitted.

Figure 18:
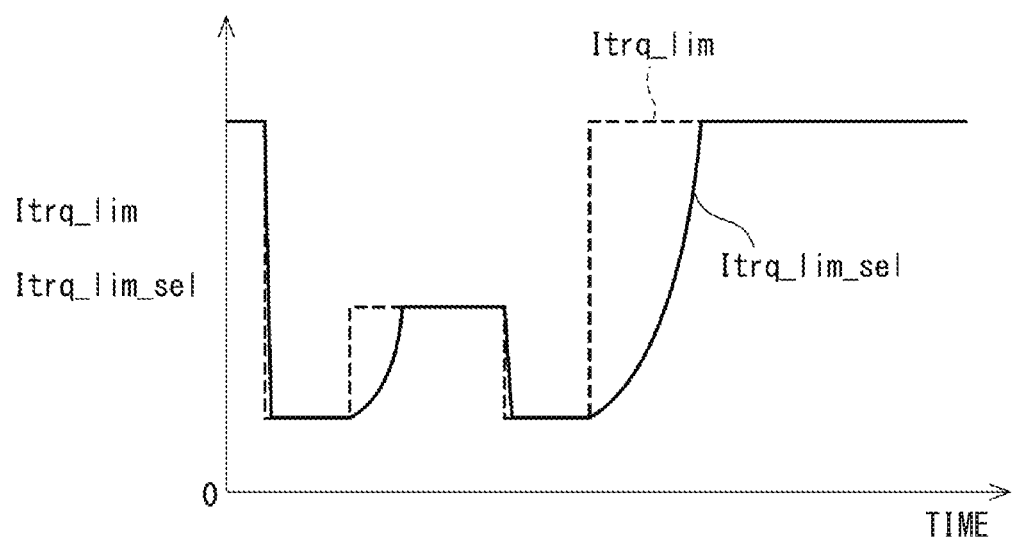
FIG. 18 is a time chart of an operation in the fifth embodiment.

The operation according to the fifth embodiment is shown in the time chart of FIG. 18. Just like the fourth embodiment, the torque current restriction value selector 47 makes the output quickly follow the target value by selecting the post-filtering torque current restriction value Itrq_lim_LPF on an input decreasing side, i.e., when the electric current is restricted. On the other hand, on the other side where the input increases, i.e., when the restriction on the electric current is released, the torque current restriction value selector 47 selects the change-amount-restricted torque current restriction value Itrq_lim_RL, thereby controlling the output to mildly follow the target value without incongruity.

In the fifth embodiment, similar to the fourth embodiment, both of (i) the protection of the motor controller 101 by the suppression of the power source current Ibatt and (ii)

the steering feel of the driver can be suitably established without compromise. Further, in the fifth embodiment, after the suppression of the rising edge slope of the output immediately after the start of the increase in the input, the rising edge slope is then gradually increased (e.g., quadratically increased). By matching the change characteristic to the driver's steering feel, a better steering feel is achievable.

In the fourth and fifth embodiments, instead of selecting the torque current restriction value Itrq_lim, the post-filtering q-axis current restriction value Iq_lim_LPF may be selected when the q-axis current restriction value Iq_lim decreases, and the change-amount-restricted q-axis current restriction value Iq_lim_RL may be selected when the q-axis current restriction value Iq_lim increases.

Sixth Embodiment

Figure 19:
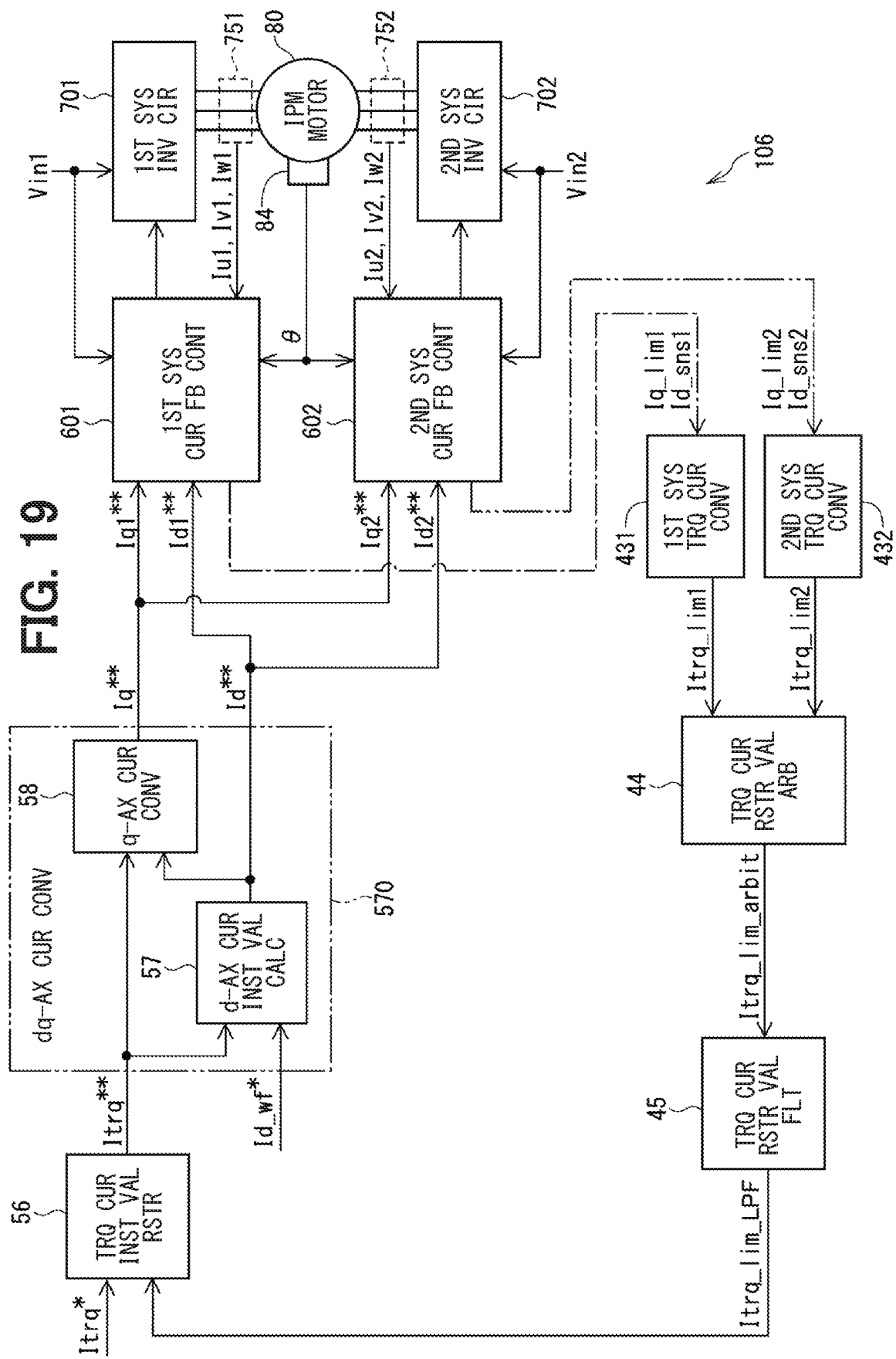
FIG. 19 is a control block diagram of a two-system motor controller in a sixth embodiment.

A two-system motor controller according to the sixth embodiment is described with reference to FIG. 19 and FIG. 20. The sixth embodiment exemplifies a simplified, or simplest, case of "N=2" in the generalized "N-system (N is an integer of 2 or more) motor controller." That is, the idea of the sixth embodiment is that it is based on an assumption that the two-system motor controller is applicable as is to the N-system motor controller of three-system or more (i.e., expandable as is). In FIG. 19, regarding the reference numerals of the components in the two-system motor controller 106 provided for each of the two systems, either a code "1" or "2" is appended as the third digit of the reference numerals of the components in the one-system motor controller 101.

As shown in FIG. 19, according to the drive signals from two current feedback controllers 601 and 602, the motor controller 106 converts, by using two inverter circuits 701 and 702, a DC power from the power source to an AC power and supplies the power to the motor 80. In a configuration in which the two inverter circuits 701 and 702 are connected in parallel to one power source, inverter input voltages Vin1 and Vin2 in the two systems are equal to each other. On the other hand, in a configuration in which the two inverter circuits 701 and 702 are individually, or respectively, connected to two independent power sources, the inverter input voltages Vin1 and Vin2 in the two systems have independent values.

The configuration of each of the current feedback controllers 601 and 602 is the same as the configuration of the current feedback controller 60 having one system shown in FIG. 3, and thus detailed description of the controllers 601, 602 is omitted. The post-restriction dq-axis current instruction values Id and Iq calculated by the dq-axis current converter 570 are distributed as the dq-axis current instruction values Id1 and Iq1 of the first system and the dq-axis current instruction values Id2 and Iq2 of the second system, and are input to the current feedback controllers 601 and 602, respectively. When the electrical characteristics of both systems are the same, one half of each of the dq-axis current instruction values Id and Iq is distributed as the current instruction value of each system.

The current feedback controller 601 of the first system drives the inverter circuit 701 by feedback control based on phase currents Iu1, Iv1, Iw1 acquired from a current sensor 751 and the electric angle θ acquired from the rotation angle sensor 84. The current feedback controller 602 of the second system drives the inverter circuit 702 by feedback control based on phase currents Iu2, Iv2, Iw2 acquired from a current sensor 752 and the electric angle θ acquired from the rotation angle sensor 84. In addition, when a phase difference of electric angle 30 [deg] is provided between the two sets of windings, for example, (θ±30) [deg] may be fed back as the electric angle of the second system. Also, a rotation angle sensor may be provided for each system.

The two-system motor controller 106 is different from the one-system motor controller 101 in terms of calculation of the torque current Itrq by two points, i.e., (i) the two-system motor controller 106 is provided with torque current converters 431 and 432 for respective systems, and (ii) the two-system motor controller 106 is provided with a torque current restriction value arbitrator 44 arbitrating the torque current restriction value Itrq_lim of each system.

The torque current converter 431 of the first system calculates a torque current restriction value Itrq_lim1 of the first system based on a q-axis current restriction value Iq_lim1 and a d-axis current detection value Id_sns1 acquired from the current feedback controller 601 of the first system. The torque current converter 432 of the second system calculates a torque current restriction value Itrq_lim2 of the second system based on a q-axis current restriction value Iq_lim2 and a d-axis current detection value Id_sns2 acquired from the current feedback controller 602 of the second system.

The torque current restriction value arbitrator 44 arbitrates the two torque current restriction values Itrq_lim1 and Itrq_lim2 calculated by the torque current converters 431 and 432 of the respective systems, and calculates one post-arbitration torque current restriction value Itrq_lim_arbit. The post-arbitration torque current restriction value Itrq_lim_arbit is output to the torque current instruction value restrictor 56 directly or via the torque current restriction value filter 45 or via the torque current restriction value selectors 46 and 47, and the torque current instruction value Itrq* is restricted, just like restriction by the one-system motor controller 101.

Here, FIG. 8 of the related art describes a configuration in which the d-axis current restriction value and the q-axis current restriction value of each system are added in the two-system motor controller. In an application of such an idea, the torque current restriction value arbitrator 44 may calculate the post-arbitration torque current restriction value Itrq_lim_arbit by simply adding the torque current restriction values Itrq_lim1 and Itrq_lim2 of each system. Such a method is effective when the electrical characteristics of each system are ideally equal to each other. However, if there is a variation in the electrical characteristics of each system, there may be a possibility that the power source current Ibatt exceeding the upper limit of durability may flow in the system having a smaller current restriction value, i.e., in a system having severer conditions.

Figure 20:
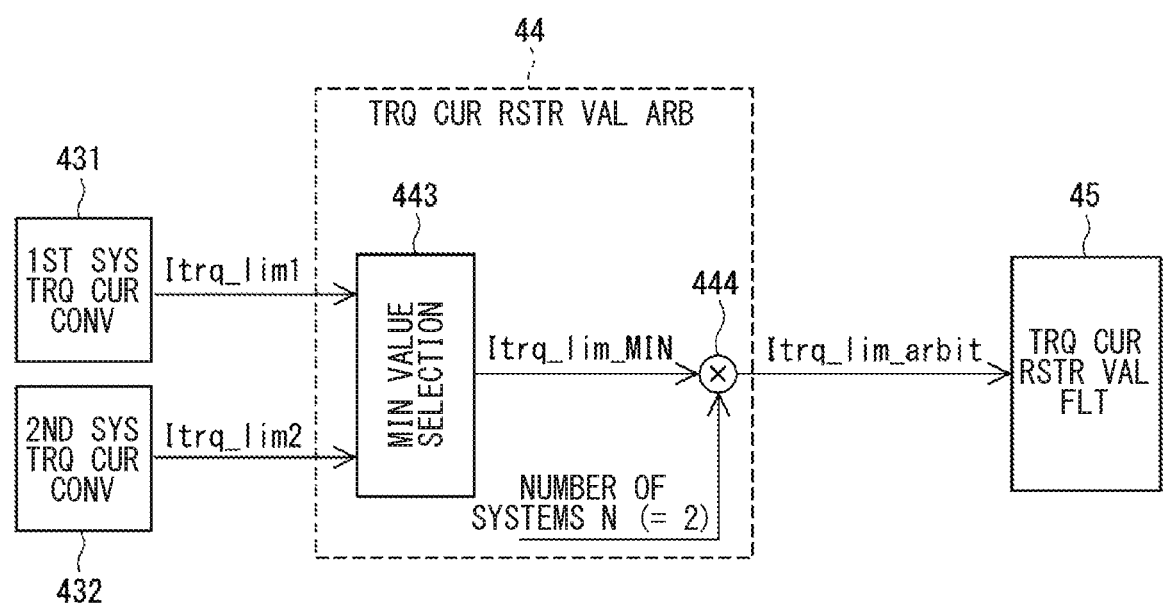
FIG. 20 is a detailed block diagram of a torque current restriction value arbitrator.

Therefore, as shown in FIG. 20, it may be preferable that the torque current restriction value arbitrator 44 adopts a configuration of minimum value selection. A minimum value selector 443 selects a minimum value Itrq_lim_MIN among the two torque current restriction values Itrq_lim1 and Itrq_lim2 calculated by the torque current converters 431 and 432 of each system. A multiplier 444 outputs a value obtained by multiplying the minimum value Itrq_lim_MIN by N, which is the number of systems, e.g., by 2 for two-system configuration as a post-arbitration torque current restriction value Itrq_lim_arbit.

In such manner, even when there is a variation in the electrical characteristics of each system, the power source current Ibatt is prevented from exceeding the upper limit of durability in all systems, because the power source current Ibatt is restricted with reference to one of plural systems having the smallest current restriction value and the severest conditions. Therefore, the system reliability is improved. Note that in case that the deviation of the torque current restriction value Itrq_lim among the plural systems exceeds a predetermined value, it may be determined that the arbitration is not possible, and the process may be shifted to an abnormality handling.

Other Embodiments (A) The torque current converter 43 of the above embodiments converts the q-axis current restriction value Iq_lim to the torque current restriction value Itrq_lim by using the d-axis current detection value Id_sns. Conversely, the torque current converter of other embodiment(s) may convert the d-axis current restriction value Id_lim to the torque current restriction value Itrq_lim by using the q-axis current detection value Iq_sns.

More specifically, the torque current converter 43 may perform the three-dimensional map calculation using the d-axis current restriction value Id_lim and the q-axis current detection value Iq_sns as its arguments, or may perform the polynomial calculation regarding the d-axis current restriction value Id_lim and the q-axis current detection value Iq_sns, for the calculation of the torque current restriction value Itrq_lim. Similarly, in the dq-axis current converter 570, instead of using the calculation configuration shown in FIG. 4, the post-restriction q-axis current instruction value Iq may be calculated first, and then the post-restriction d-axis current instruction value Id may be calculated by the three-dimensional map. Also, instead of or in addition to the torque current restriction value filter 45, a current restriction value filter may be provided for receiving the d-axis current restriction value Id_lim as an input and removing high frequency components therefrom.

In addition, since the d-axis current restriction value Id_lim is a negative value, in an application of the above to the third embodiment, the condition phrase may be modified to, for example, (i) the first cutoff frequency fco1 is used "when an absolute value of the input decreases" and (ii) the second cutoff frequency fco2 is used "when an absolute value of the input increases." Further, in an application to the fourth or fifth embodiment, the modified wording may then be that the post-filtering d-axis current restriction value Id_lim_LPF is selected "when an absolute value of the input decreases" and the change-amount-restricted d-axis current restriction value Id_lim_RL is selected "when an absolute value of the input increases."

(B) In the two-system motor controller 106 of the sixth embodiment, the two current feedback controllers 601 and 602 may perform "sum and difference control." In the "sum and difference control," the sum of the two dq-axis current detection values and the difference of the two dq-axis current detection values are respectively fed back to the sum of the two dq-axis current instruction values and to the difference of the two dq-axis current instruction values. Further, when the electrical characteristics of the two systems are equal to each other, the difference of the two dq-axis current instruction values of the two systems is treated as zero.

(C) The motor controller of the present disclosure is implementable as a device not only for driving the steering assist motor of an electric power steering device, but also for driving the IPM motor in any application purposes.

The present disclosure should not be limited to the embodiments described above, and various other embodiments may be implemented without departing from the scope of the present disclosure.

The controller described in the present disclosure and the method thereof may be realized by a dedicated computer having a processor and a memory programmed to perform one or more functions embodied by a computer program. Alternatively, the controller described in the present disclosure and the method thereof may be realized by a dedicated computer having a processor with one or more dedicated hardware logic circuits. Alternatively, the controller and the method described in the present disclosure may be realized by a dedicated computer that is provided as a combination of (i) a processor and a memory programmed to perform one or more functions and (ii) a processor having one or more hardware logic circuits. Further, the computer program may also be stored in a computer readable non-transitory, tangible storage medium as computer-executable instructions.

What is claimed is:

1. A motor controller for driving an interior permanent magnet (IPM) motor by a feedback control of a dq-axis current detection value against a dq-axis current instruction value, the motor controller comprising:

an inverter circuit configured to supply an alternating current to the motor after conversion from a direct current of a power source;

a dq-axis current detection value calculator configured to calculate a d-axis current detection value and a q-axis current detection value after coordinate conversion of a detection value of a phase current flowing from the inverter circuit to the motor;

a target power source current calculator configured to calculate a target power source current as an upper limit value of a power source current flowing from the power source to the inverter circuit; and a dq-axis current restriction value calculator configured to calculate a q-axis current restriction value or a d-axis current restriction value so as to control the power source current to be equal to or lower than the target power source current;

a torque current converter configured to convert
  (a) the q-axis current restriction value to a torque current restriction value that is a restriction value of a torque current by using the d-axis current detection value, or
  (b) the d-axis current restriction value to the torque current restriction value by using the q-axis current detection value, wherein the torque current restriction value is defined as a restriction value of a torque current that is proportional to an output torque of the motor;

a torque current instruction value restrictor configured to restrict, by using the torque current restriction value, a torque current instruction value that is converted from a torque instruction value requested to the motor;

a dq-axis current converter configured to convert a post-restriction torque current instruction value to a d-axis current instruction value and a q-axis current instruction value; and a dq-axis voltage instruction value calculator configured to calculate at least one of (i) a target value of an output voltage of the inverter circuit or (ii) a d-axis voltage instruction value and a q-axis voltage instruction value respectively correlated to the target value, for the d-axis current detection value and the q-axis current detection value to respectively follow the d-axis current instruction value and the q-axis current instruction value, wherein the dq-axis current restriction value calculator calculates the q-axis current restriction value or the d-axis current restriction value based on (i) the d-axis voltage instruction value, the q-axis voltage instruction value, the d-axis current detection value or the q-axis current detection value and (ii) the target power source current.

2. The motor controller of claim 1, wherein
the torque current converter calculates the torque current restriction value by a map calculation that uses, as arguments, at least one of (a) the q-axis current restriction value and the d-axis current detection value, or (b) the d-axis current restriction value and the q-axis current detection value.

3. The motor controller of claim 1, wherein
the torque current converter calculates the torque current restriction value by a polynomial calculation that uses at least one of (a) the q-axis current restriction value and the d-axis current detection value, or (b) the d-axis current restriction value and the q-axis current detection value.

4. The motor controller of claim 1, wherein
the motor controller controls a plurality of systems on a condition that a system is defined as a group of configuration elements that calculates an instruction to the inverter circuit by a current feedback control, and
the motor controller further comprises a torque current restriction value arbitrator (a) arbitrating a plurality of the torque current restriction values respectively calculated by the torque current converters in the plurality of systems and (b) calculating a post-arbitration torque current restriction value.

5. The motor controller of claim 4, wherein
the torque current restriction value arbitrator calculates the post-arbitration torque current restriction value by multiplying a minimum value among the plurality of the torque current restriction values respectively calculated by the torque current converters in the plurality of systems by a number of systems N, where N is an integer of 2 or more.

6. The motor controller of claim 1, further comprising:
a torque current restriction value filter configured to filter a high frequency component of equal to or greater than a preset cut-off frequency by having an input of one of the torque current restriction value, the q-axis current restriction value, or the d-axis current restriction value, wherein
a first cut-off frequency used by the torque current restriction value filter at a filter input decreasing time is set to a higher value than a second cut-off frequency used by the torque current restriction value filter at a filter input increasing time, the filter input decreasing/increasing time respectively defined as a time during which an absolute vale of the input of the filter is decreasing/increasing.

7. The motor controller of claim 1, further comprising:
a torque current restriction value selector including:
a current restriction value filter (a) configured to filter a high frequency component of equal to or greater than a preset cut-off frequency from an input of one of the torque current restriction value, the q-axis current restriction value, or the d-axis current restriction value and (b) outputting a post-filtering current restriction value;
a change amount restrictor configured to output a change-amount-restricted current restriction value that has a restricted per-unit-time change amount when an absolute value of the input increases; and
an output selector (a) configured to select at least one of (i) the post-filtering current restriction value during a decrease of the absolute value of the input or (ii) the change-amount-restricted current restriction value during an increase of the absolute value of the input and (b) outputting selection as a selected current restriction value,
wherein
the change amount restrictor performs linear processing making a per-unit-time increase of the output constant.

8. The motor controller of claim 1, further comprising:
a torque current restriction value selector including:
a current restriction value filter (a) configured to filter a high frequency component of equal to or greater than a preset cut-off frequency from an input of the torque current restriction value, the q-axis current restriction value, or the d-axis current restriction value and (b) outputting a post-filtering current restriction value;
a change amount restrictor configured to output a change-amount-restricted current restriction value that has a restricted per-unit-time change amount during an increase of an absolute value of the input; and
an output selector (a) configured to select at least one of (i) the post-filtering current restriction value during a decrease of the absolute value of the input or (ii) the change-amount-restricted current restriction value during the increase of the absolute value of the input and (b) outputting selection as a current restriction selection value, wherein
the change amount restrictor performs an incremental process that gradually increases a per-unit-time increase of the output.

9. An electric power steering device comprising:
a motor configured to output a steering assist torque; and
a motor controller for driving an interior permanent magnet (IPM) motor by a feedback control of a dq-axis current detection value against a dq-axis current instruction value, wherein the motor controller includes:
an inverter circuit configured to supply an alternating current to the motor after conversion from a direct current of a power source;
a dq-axis current detection value calculator configured to calculate a d-axis current detection value and a q-axis current detection value after coordinate conversion of a detection value of a phase current flowing from the inverter circuit to the motor;
a target power source current calculator configured to calculate a target power source current as an upper limit value of a power source current flowing from the power source to the inverter circuit; and
a dq-axis current restriction value calculator configured to calculate a q-axis current restriction value or a d-axis current restriction value so as to control the power source current to be equal to or lower than the target power source current;
a torque current converter configured to convert
(a) the q-axis current restriction value to a torque current restriction value that is a restriction value of a torque current by using the d-axis current detection value, or
(b) the d-axis current restriction value to the torque current restriction value by using the q-axis current detection value, wherein the torque current restriction value is defined as a restriction value of a torque current that is proportional to an output torque of the motor;

a torque current instruction value restrictor configured to restrict, by using the torque current restriction value, a torque current instruction value that is converted from a torque instruction value requested to the motor;

a dq-axis current converter configured to convert a post-restriction torque current instruction value to a d-axis current instruction value and a q-axis current instruction value; and a dq-axis voltage instruction value calculator configured to calculate at least one of (i) a target value of an output voltage of the inverter circuit or (ii) a d-axis voltage instruction value and a q-axis voltage instruction value respectively correlated to the target value, for the d-axis current detection value and the q-axis current detection value to respectively follow the d-axis current instruction value and the q-axis current instruction value, wherein the dq-axis current restriction value calculator calculates the q-axis current restriction value or the d-axis current restriction value based on (i) the d-axis voltage instruction value, the q-axis voltage instruction value, the d-axis current detection value or the q-axis current detection value and (ii) the target power source current.

* * * * *